(12) United States Patent
Mendenhall et al.

(10) Patent No.: US 7,616,888 B2
(45) Date of Patent: Nov. 10, 2009

(54) METHOD AND SYSTEM FOR MEASURING OPTICAL PROPERTIES OF A MEDIUM USING DIGITAL COMMUNICATION PROCESSING TECHNIQUES

(75) Inventors: Scott Nelson Mendenhall, Fort Wayne, IN (US); Michael E. Dobbs, Fort Wayne, IN (US); Benjamin R. Neff, West Lafayette, IN (US); James Alexander McAdoo, El Segundo, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 845 days.

(21) Appl. No.: 10/959,368

(22) Filed: Oct. 6, 2004

(65) Prior Publication Data

US 2005/0100336 A1    May 12, 2005

Related U.S. Application Data

(60) Provisional application No. 60/517,953, filed on Nov. 6, 2003.

(51) Int. Cl.
 *H04B 10/08* (2006.01)
 *G01N 21/00* (2006.01)
(52) U.S. Cl. .................... 398/25; 398/27; 398/26; 356/432; 250/343
(58) Field of Classification Search ............ 398/25–27, 398/115–131; 356/432–442, 448, 339; 250/343
 See application file for complete search history.

(56) References Cited

U.S. PATENT DOCUMENTS

| 4,480,190 | A | * | 10/1984 | Burough et al. ............. 250/343 |
| 5,835,199 | A | | 11/1998 | Phillips et al. |
| 6,205,169 | B1 | * | 3/2001 | Nakamura .................... 375/152 |
| 6,714,286 | B1 | * | 3/2004 | Wheel ......................... 356/5.05 |
| 2002/0037033 | A1 | * | 3/2002 | During ......................... 375/224 |
| 2002/0061073 | A1 | * | 5/2002 | Huang et al. ................. 375/295 |
| 2003/0002141 | A1 | * | 1/2003 | DeCusatis et al. ....... 359/337.11 |
| 2004/0062551 | A1 | * | 4/2004 | ElBatt et al. ................. 398/115 |
| 2004/0213579 | A1 | * | 10/2004 | Chew et al. .................. 398/183 |

FOREIGN PATENT DOCUMENTS

WO  WO 03/040894 A2  5/2003
WO  WO 03/084281 A1  10/2003

OTHER PUBLICATIONS

Abshire et al: "Laser Sounder Approach for Measuring Atmospheric CO2 from Orbit", Preceedings of the Third Annual Earth Science Technology Conference, Maryland, Jun. 24-26, 2003, pp. 1-6.*

(Continued)

*Primary Examiner*—Ken N Vanderpuye
*Assistant Examiner*—Li Liu
(74) *Attorney, Agent, or Firm*—Ratner Prestia

(57) ABSTRACT

A system for measuring properties of a medium includes an electromagnetic generator for forming a CW carrier, a digital encoder for forming a digital message, and a modulator for modulating the CW carrier with the digital message to form a digitally modulated CW carrier. The medium provides a channel for propagating the digitally modulated CW carrier. The system further includes a receiver configured to receive the propagated, digitally modulated CW carrier, and a processor for measuring at least one property of the medium. The medium may be disposed within a gaseous atmosphere, a body of water, or a cell of a laboratory.

19 Claims, 15 Drawing Sheets

OTHER PUBLICATIONS

Patent Abstract of Japanese Publication No. 2002217875.
Patent Abstract of Japanese Publication No. 2003060588.
"An Automated Method for BER Characteristics Measurement", S.M. Berber, Institute of Electrical and Electronics Engineers. IMTC 2001. Proceedings of the 18$^{th}$. IEEE Conference, Buapest, Hungary, May 21-23, 2001, IEEE Instrumentation and Measurement Technology Conference. (IMTC):, New York, NY: IEEE< US, vol. vol. 1 of 3. Conf. 18, May 21, 2001, pp. 1491-1495.
J.B. Abshire et al., "Laser Sounder Approach for Measuring Atmospheric CO2 from Orbit", NASA Goddard Space Flight Center, pp. 1-6.

* cited by examiner

METHOD AND SYSTEM FOR MEASURING OPTICAL PROPERTIES OF A MEDIUM USING DIGITAL COMMUNICATION PROCESSING TECHNIQUES

CROSS REFERENCE TO RELATED APPLICATIONS

This application claims priority of U.S. Provisional Application Ser. No. 60/517,953, filed on Nov. 6, 2003, the contents of which are incorporated herein by reference.

FIELD OF THE INVENTION

This invention relates to detecting and measuring optical properties of a medium using light detection and ranging (LIDAR) techniques or laser detection and ranging (LADAR) techniques. More specifically, this invention relates to measuring optical properties of a medium using digital communication processing techniques.

BACKGROUND OF THE INVENTION

Active remote sensing may be conceptualized as viewing radiation reflected and/or emitted from a certain location in one or more wavelength regions. Active remote sensing typically utilizes one or more sources of radiation (e.g., infrared, visible, or ultraviolet light) to illuminate a target area while measuring the reflected, scattered and/or emitted radiation at one or more receive detectors. Such remote sensing may be performed from a moving platform or from a stationary location, each of which may be spatially remote from the target area.

One method for performing active remote sensing is to stare at an area with a single detector, while illuminating the area with one or more wavelengths of radiation. Various sources of noise, however, may lower the signal-to-noise ratio (SNR) of the measurement. Examples of such noise typically present in active remote sensing include solar background radiation, 1/f noise (i.e., noise whose power varies inversely with frequency), atmospheric turbulence, and/or scintillation, and noise from varying reflectivity.

Thus, there is a need in the art to perform active remote sensing, using compact efficient transmitters and compact receivers while maintaining a high signal-to-noise ratio.

SUMMARY OF THE INVENTION

To meet this and other needs, and in view of its purposes, the present invention provides a system for measuring properties of a medium. The system includes an electromagnetic generator for forming a CW carrier, a digital encoder for forming a digital message, and a modulator for modulating the CW carrier with the digital message to form a digitally modulated CW carrier. The medium provides a channel for propagating the digitally modulated CW carrier. The system also includes a receiver configured to receive the propagated, digitally modulated CW carrier, and a processor for measuring at least one property of the medium, or for identifying the medium. The medium may be disposed within a gaseous atmosphere, a body of water, or a cell of a laboratory.

Another embodiment of the invention is a system for chemical identification of a medium. The system includes a laser for generating a CW carrier, a digital encoder for forming an encoded word, and an electro-optic (EO) modulator for modulating the CW carrier with the encoded word to form an encoded CW carrier. The encoded CW carrier is propagated through the medium. The system also includes a receiver configured to detect the propagated, encoded CW carrier to form a detected signal, and a processor configured to measure bit error rate (BER) of the detected signal and identify the medium based on the measured BER. The digital encoder may be configured to form at least one pseudonoise (PN) encoded word. The processor may measure the BER of the detected signal based on the PN encoded word.

Still another embodiment of the invention is a system for chemical identification of a medium. The system includes an online laser for generating an online CW carrier; an offline laser for generating an offline CW carrier, the offline CW carrier including a wavelength different from a wavelength of the online CW carrier; a PN encoder for forming a PN encoded word; a PN' encoder for forming a PN' encoded word, the PN' encoded word being orthogonal to the PN encoded word; and modulators for, respectively, modulating the online and offline CW carriers with the PN and PN' encoded words. The modulated online and offline CW carriers are propagated through the medium. The system further includes a receiver configured to detect the propagated, modulated online and offline CW carriers to form a detected signal; and a processor configured to correlate the detected signal with the PN and PN' encoded words, where the processor measures a property of the medium based on the correlated detected signal with the PN and PN' encoded words. The system may include a wavelength controller, coupled to the online laser, for modifying a wavelength of the online CW carrier. The medium may include an absorption line, and the wavelength controller may be configured to modify the wavelength of the online CW carrier by scanning about the absorption line. The receiver may include a reference detector for forming a reference signal of the PN and the PN' encoded words; and the processor may correlate the reference signal with the PN and the PN' encoded words, and provide a measure of the effect of propagation through the medium, based on (a) correlation of the detected signal and (b) correlation of the reference signal, respectively, with the PN and PN' encoded words.

Yet another embodiment of the invention is a system for chemical identification of a medium. The system includes a laser for generating an optical beam, a digital modulator for modulating the optical beam to form a digitally modulated optical carrier, and a transmitter for transmitting the digitally modulated optical carrier through the medium. The system further includes a receiver for detecting the digitally modulated optical carrier from the medium to form a detected signal, and a processor for measuring at least one property of the medium based on the detected signal. The receiver may include a first photon counter for counting photons of the digitally modulated carrier, received from the medium, to form the detected signal. The receiver may also include a second photon counter for counting photons of the digitally modulated optical carrier, transmitted toward the medium, to form a reference signal. The processor may include a calculator for determining an effect of propagation of the digitally modulated optical carrier through the medium, based on photons counted by both of the photon counters.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
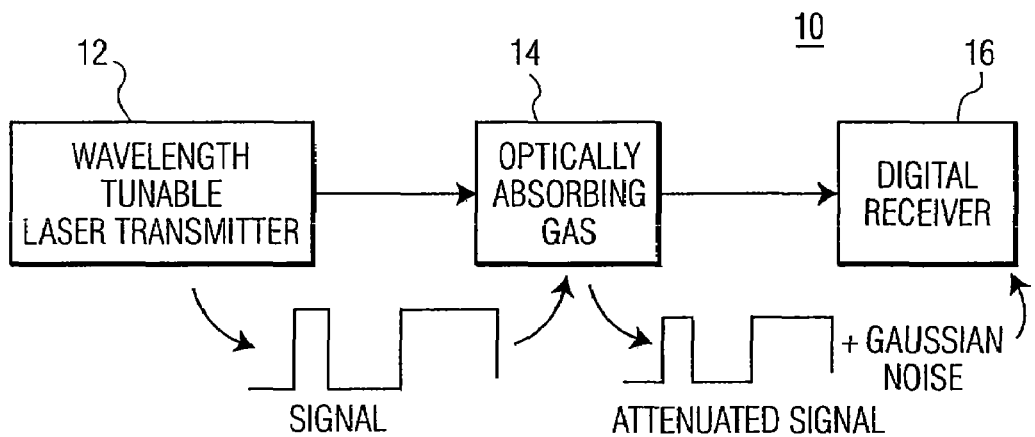
FIG. 1 is a block diagram of a digital LIDAR/LADAR system, showing a tunable laser transmitter for transmitting a digitally encoded signal through optically absorbing gas and a receiver for receiving the digitally encoded signal and decoding the signal to identify properties of the gas, in accordance with an embodiment of the invention.

Digital communications is distinctly different from other forms of communications (spark gap, AM, FM, etc). These other forms of communications are fundamentally analog in nature. While FM is superior to AM, it is, nevertheless, another analog communications method. Analog communication methods all share a common feature, in which the goal is to preserve the "shape" of the waveform with as much fidelity as possible through the communications link. All of the processes associated with these analog systems pertain to accomplishing the task of preserving the signal waveform in its entirety, as faithfully as possible. A difference between AM and FM is the degree of faithfulness required to preserve the signal waveform, in the presence of external interference and noise. All of the conventional concepts of linearity, SNR, bandwidth, frequency response, etc., are derived from this overall goal.

In digital systems, however, the exact shape of the waveform is not that important. The goal of a digital system is to preserve the information content, not the details of its analog waveform. The information content is represented in binary form and the waveforms need only be sufficiently good to preserve the ones and zeros that are of interest. Design of a digital communications system is oriented on preserving the ones and zeros and not in faithfully reproducing its analog waveforms. This provides advantages, realized by the inventors, that are not possible in analog communication systems and may advantageously be used for active remote sensing.

For example, an analog repeater is specified in terms of gain, frequency response, linearity and noise. Repeaters that are linear over a large dynamic range are hard to realize. In addition, linear repeaters inject additional noise which degrades the analog signal after each pass through a repeater. Consequently, the number of useful repeater stages in a communications link is limited. This is a basic limitation of analog communications.

In digital communications, however, the situation is quite different. Repeaters are replaced with regenerators, in which the ones and zeros are recovered using a binary threshholding process that is immune to analog noise. In addition, forward error correction (FEC) may be applied to recover the small number of bad bits that may be received. The resulting digital data is then re-transmitted as a new stream of ones and zeros at the full signal strength and full data quality of the original message. This process may be repeated practically an unlimited number of times with no loss of useful information. This example relates only to digital communication systems, as it cannot be done in analog communication systems.

While RF and optical communication systems have followed this natural evolution, active remote sensor technology has not. In fact, active remote sensing is still seen as a fundamentally analog process, in which the goal is still to preserve and measure analog waveforms. Moreover, pulse laser based LIDARs are essentially analogous to spark-gap radio transmitters. The only way to improve such a system is by building a bigger "spark" (i.e. provide more laser power). There is little else that may be done, other than minor incremental improvements in detectors, which do not yield significant benefits.

The inventors have discovered that a digital LIDAR or LADAR system may be used to identify or measure properties of a medium (for example, reflection, shape, polarization, chemical, biological, vibration). The inventors, thus, use a digital LIDAR or LADAR system as an optical information system rather than as an analog link. The output of the transmitter of the LIDAR or LADAR system, in one embodiment of the invention, is a stream of bits that are transmitted into an external medium (for example gas) and recovered by a LIDAR or LADAR receiver. The manner in which the external medium modifies these bits via absorption, polarization effects, reflection, etc., is recovered from the received bit sequence by subsequent data processing. This digital "transfer function" is used to identify or measure the properties of the external medium.

Many different digital communication processing techniques may be used to identify and measure the optical properties of a medium. The following is a description of some of these processing techniques.

Referring to FIG. 1, there is shown a digital LIDAR/LADAR system, generally designated as 10. System 10 includes wavelength tunable laser transmitter 12 and digital receiver 16. As shown, the wavelength tunable laser transmitter transmits an encoded digital signal through an optically absorbing gas, designated as 14. The same signal is then returned to the digital receiver which decodes the encoded signal. The gaseous absorption of the encoded signal results in a decrease of signal level or $E_b$ (energy per bit), which in turn causes a change in the average number of bit errors per second.

As will be explained, in one embodiment of the invention, the bit error rate (BER) may used as a direct measure of gaseous absorption. Various modulation types and various encoding methods may be used to achieve the desired sensitivity of the transmitted signal to affect the absorbing gas.

The gaseous absorption of the encoded signal, typically, results in a decrease of signal level. Digital receiver 16 measures the BER of the received signal at a point where a small change in signal level ($E_b/N_o$) results in a large change in bit error probability ($P_B$). This is best illustrated in FIG. 2.

Figure 2:
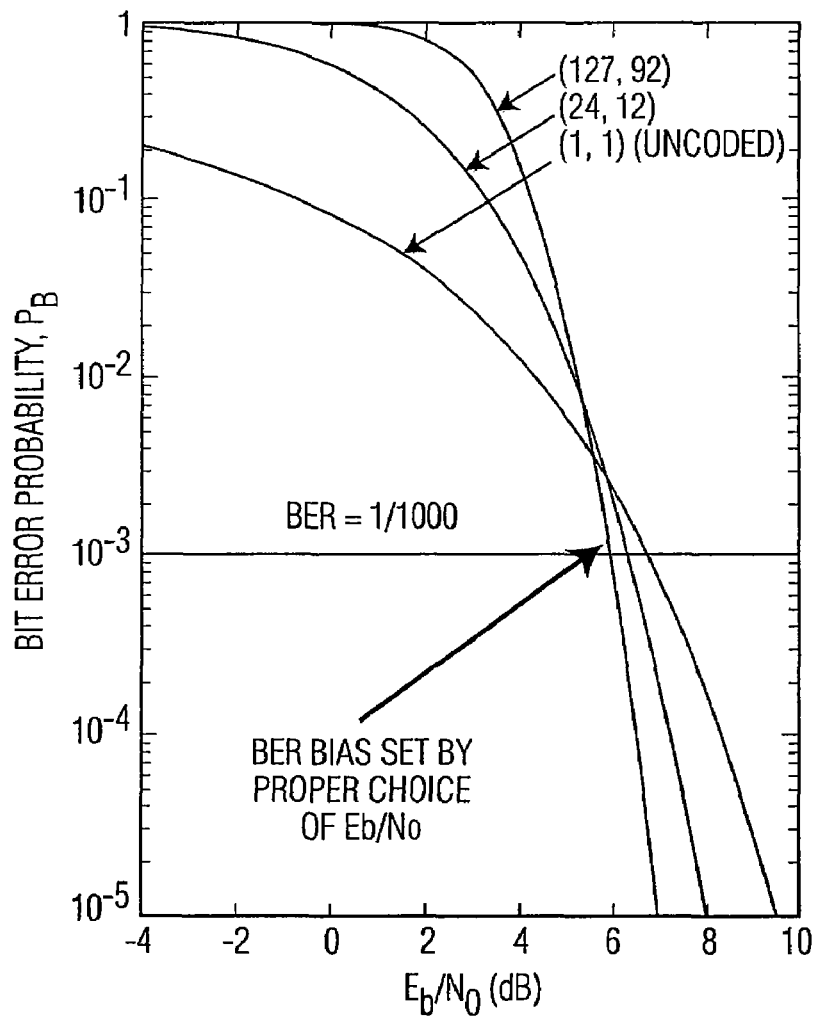
FIG. 2 is a plot of bit error probability versus $E_b/N_o$ showing that the bit error rate (BER) bias may be set by proper choice of $E_b/N_o$, in accordance with an embodiment of the invention.

Three curves of bit error probability versus $E_b/N_o$ are shown in FIG. 2 for coherent phase shift keying (PSK) with different (N,M) encoding schemes. The M is the number of bits in a message and N is the number of bits that form an encoded word of the M-message bits. Typically, N is greater than M. The encoding scheme is also known as the Bose-Chaudhuri-Hocquenqhem (BCH) Code. One curve, shown in FIG. 2, is for uncoded (1,1) PSK and the other two curves are for coded (24, 12) PSK and coded (127, 92) PSK. In accordance with an embodiment of the invention, the BER is set by the digital LIDAR/LADAR system, so that a small change in received signal level ($E_b/N_o$) produces a large change in bit error probability ($P_B$).

For example, as shown in FIG. 2, the system may select coherent PSK with (24, 12) code and set BER to 1/1000. If the signal processing gain of the receiver is set to 6 dB, a very small change in received signal level would result in a very large change in bit error probability. As the transmitter of the LIDAR/LADAR system is tuned in wavelength to identify, for example, a CO2 absorption line (shown in FIG. 3), the signal level of the received signal is reduced as a result of the gaseous absorption of CO2. In this manner, CO2 gas may be identified. Other gases may similarly be identified.

As another example, the system may select coherent PSK with (127, 92) code and set the BER to 1/1000. As may be seen in FIG. 2, using the (127, 92) code increases the slope sensitivity of the detection process of system 10. Exemplary detection processes of system 10 using digital communications architecture are discussed below with reference to FIGS. 4 through 13.

Figure 4:
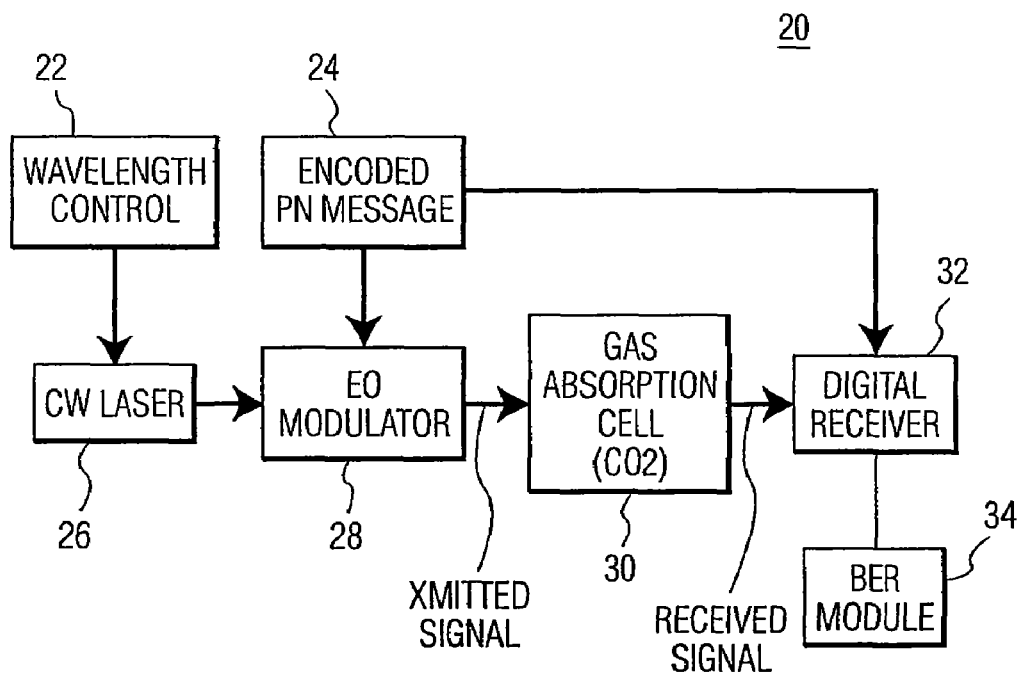
FIG. 4 is a block diagram of a digital LIDAR/LADAR system using a digital communications architecture, including a CW laser transmitter transmitting a wavelength modulated and digitally encoded PN signal through a gas absorbing cell, and a digital receiver for decoding the received signal using BER as a direct measure of gaseous absorption in the cell, in accordance with an embodiment of the invention.

Referring first to FIG. 4, there is shown a block diagram of a digital LIDAR/LADAR system, which is implemented using a digital communications architecture, generally designated as 20. System 20 includes wavelength controller 22, CW laser 26, pseudorandom noise (PN) message encoder 24, optics modulator 28, digital receiver 32 and BER module 34. As shown, PN message encoder 24 encodes the transmitted signal, which is used by receiver 32 to decode the received signal. The transmitted signal is propagated through (or reflected from) gas absorption cell 30, modified or disturbed by the cell, and received by digital receiver 32.

In one implementation, cell 30 may include, for example, a cell in a laboratory environment. In another implementation, cell 30 may include a volume of the atmosphere, which may or may not have a scattering background (e.g., the ground, for a down-looking fielded system, such as system 10 or 20). Cell 30 may include a solid surface (e.g., the ground), objects (e.g., vehicles), vegetation, chemicals, gas/aerosol, or any other typical target of active remote sensing that has spectral features capable of spectral measurement. Cell 30 may include a substance (for example CO2) having at least one absorption/reflection feature, around which the tunable source may be swept in wavelength (CW laser 26 tuned by wavelength controller 22). Cell 30 may also include a substance in water (fore example a mineral in the sea).

As will be further described, CW laser 26 is wavelength controlled and digitally modulated by an encoded PN message (for example). The PN modulated laser output signal is transmitted through gas absorption cell 30. The PN modulated signal is returned and received by digital receiver 32, which uses the encoded PN message as a reference to decode the PN modulated signal. The BER is used as a direct measure for detecting and identifying the gas absorption cell. As the wavelength of the laser signal is tuned, the BER measurements detect the absorption line, for example the CO2 absorption line of FIG. 3. The BER changes very rapidly at the absorption line.

The encoded PN message, provided by PN encoder 24, may include M message bits encoded to form an N-bit encoded word. The N-bit encoded word is modulated onto an optical carrier. In one implementation, an electro-optic device, such as EO-modulator 28, may be used to modulate the intensity of a narrow frequency band of a CW laser beam, produced by CW laser 26.

It will be appreciated that digital modulation is a process by which digital symbols are transformed into waveforms that are compatible with the characteristics of a communications channel. Thus, in one implementation, the presence of a "1" at the modulator input results in the transmission of a certain kind of waveform (laser intensity vs time) and the presence of a "0" at the input to the modulator results in the transmission of another type of waveform. The waveforms for a "1" and a "0" may be represented by a predetermined number of equally-spaced time samples. These samples may be sent in sequence to the electro-optic device to intensity modulate the laser radiation and affect the transmission of a "1" or a "0" waveform.

Figure 5:
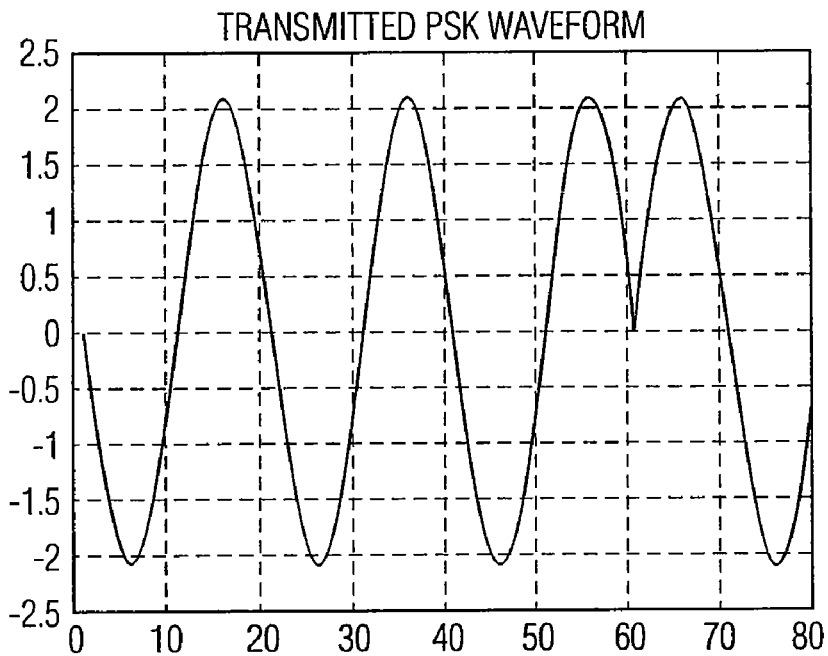
FIG. 5 shows a transmitted phase shift keyed (PSK) waveform in which a "1" is represented by a sine waveform and a "0" is represented by a 180° phase-shifted sine waveform, in accordance with an embodiment of the invention.

By way of example, FIG. 5 shows a transmitted phase shift keyed (PSK) waveform, in which a "1" is represented by a sine waveform (for example) and a "0" is represented by a 180° phase-shifted sine waveform (for example). The transmitted PSK waveform, as shown in FIG. 5, represents four bits of "1110".

Although not shown in FIG. 4, it will be appreciated that EO modulator 28 may include an amplifier, such as an Erbium-doped fiber amplifier. The amplified, modulated laser radiation may be radiated into the environment using transmit optics to appropriately shape its spatial distribution and determine its direction of travel. In one implementation a collimator to create a slowly diverging beam of laser radiation may be used. The amplified, modulated laser radiation may be transmitted through the medium of interest. The transmitted laser radiation may be intercepted by receiver optics included in digital receiver 32.

The received laser radiation may be detected to produce a voltage signal at the input to a demodulator (part of digital receiver 32). The detection process may include photo-detection, photocurrent signal amplification, and electronic filtering. The detection process produces an analog signal, which may be sampled, and these signal samples may be sent to the demodulator. This is discussed in greater detail with respect to FIGS. 9, 10, 12 and 13.

Figure 6:
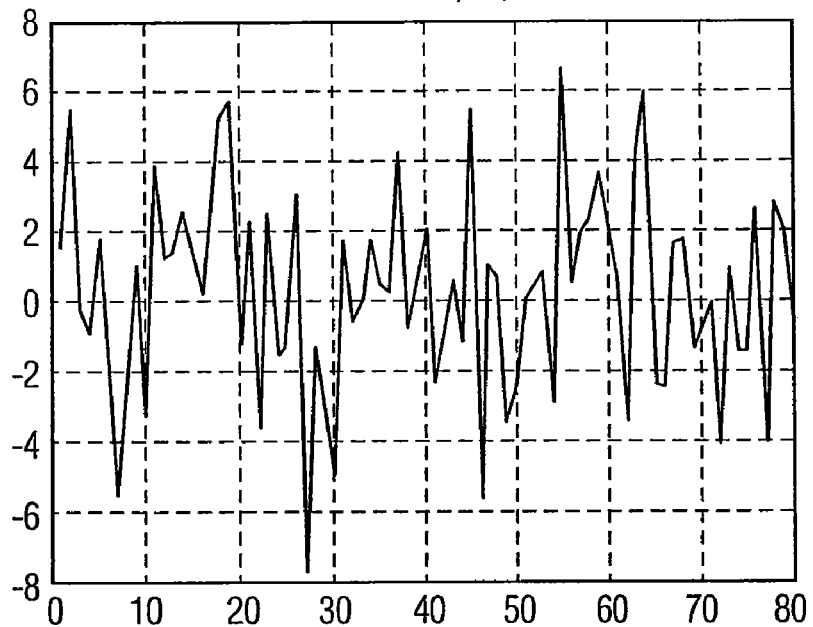
FIG. 6 illustrates a sampled, received PSK waveform, based on the transmitted PSK waveform of FIG. 5, in accordance with an embodiment of the invention.

By way of example, FIG. 6 illustrates a sampled, received PSK waveform, based on the transmitted PSK waveform of FIG. 5. As shown, there are 20 samples per bit. Although during sampling of the received signal, $E_b/N_o$ is set to only 3.5 dB, receiver 32 recovers the four transmitted bits of "1110" of FIG. 5. Recovery of the transmitted PN encoded message is discussed in greater detail later.

Figure 7:
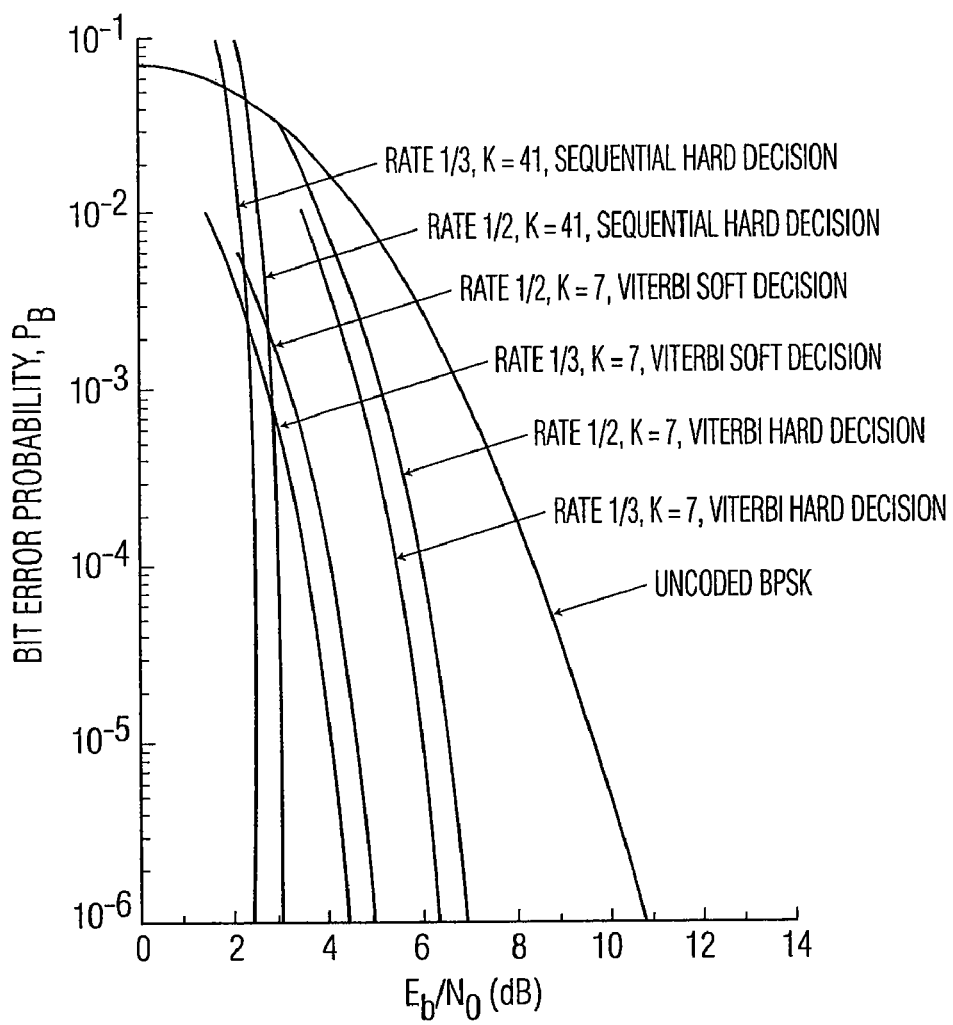
FIG. 7 is a plot of bit error probability versus $E_b/N_o$ showing that gas detection sensitivity may be controlled by choosing a digital encoding method and a modulation type.

Referring next to FIG. 7, another set of curves is shown depicting bit error probability ($P_B$) as a function of $E_b/N_o$ for various Viterbi and sequential decoding schemes, using coherent binary phase shift keying (BPSK) over a digital communications channel. As may be observed (similarly to the set of curves of FIG. 52), as the code length is increased (from uncoded, k=1, to a longer code of k=41), the sensitivity of BER may also be increased, by selecting a curve with a greater slope. In this manner, a very small change of $E_b/N_o$ in the digital receiver may produce a very large change in bit error probability. This change may be measured by BER module 34 of system 20. Thus, gas detection sensitivity of the digital receiver may be controlled by selecting a proper encoding method and a proper modulation type.

Figure 8:
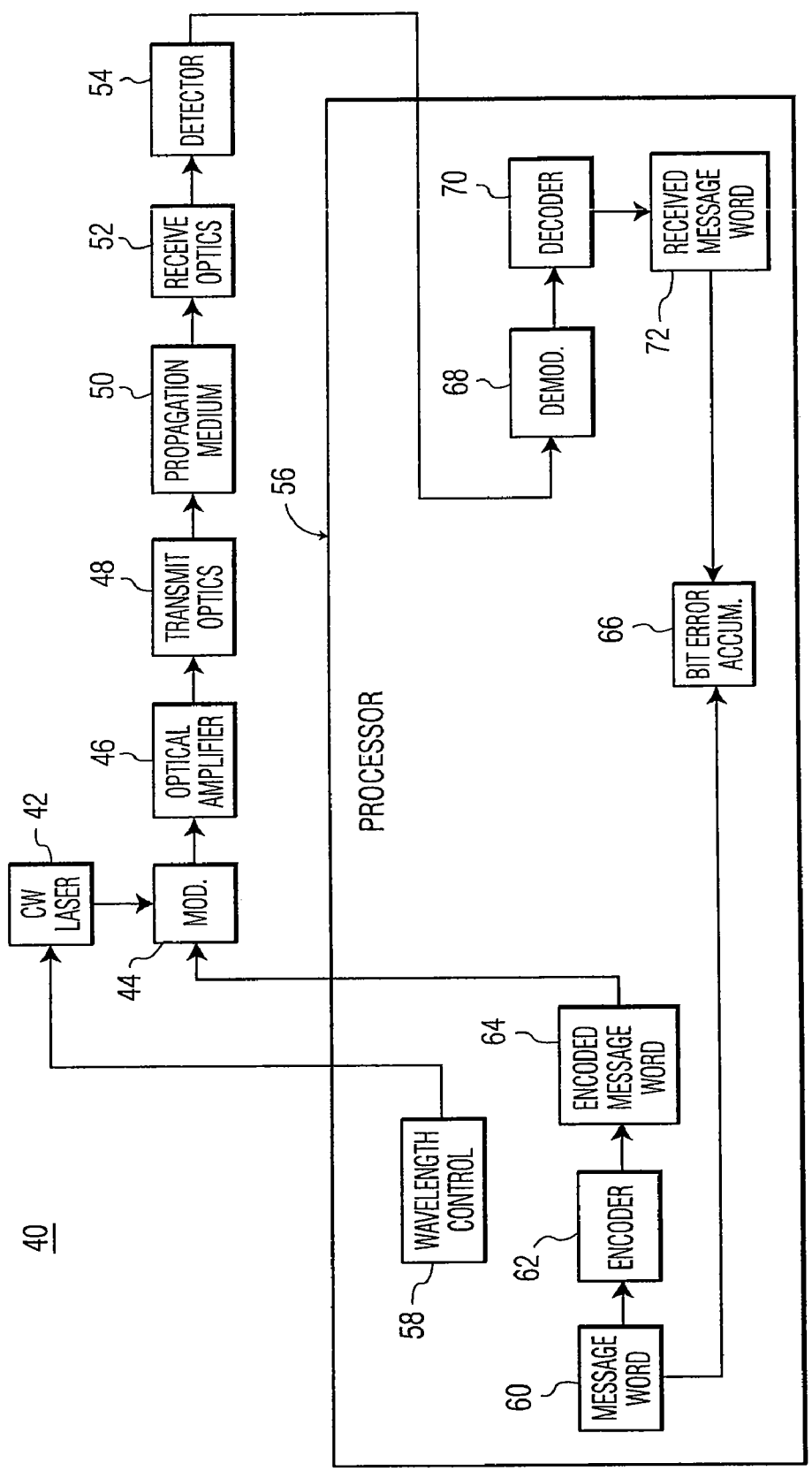
FIG. 8 is a block diagram of a digital LIDAR/LADAR system using a digital communications architecture, including a bit error accumulator for measuring bit errors between a transmitted digital signal and a received digital signal, in accordance with an embodiment of the invention.

Referring next to FIG. 8, there is shown a system for measuring optical properties of a medium, in accordance with an embodiment of the invention. The system, generally designated as 40, includes a transmitting portion and a receiving portion. The transmitting portion includes CW laser 42, modulator 44, optical amplifier 46 and transmit optics 48. The receiving portion includes receive optics 52 and detector 54. Included in both the receiving portion and the transmitting portion is processor 56. The transmit optics transmits the optical laser signal through propagation medium 50. The transmitted laser signal is transmitted through the propagation medium, or reflected from the propagation medium, and received by receive optics 52.

As shown in FIG. 8, processor 56 includes wavelength controller 58 for controlling the output wavelength of CW laser 42. Processor 56 also includes message word module 60, encoder module 62 and encoded message word module 64. The message word module forms a digital message word composed of M message bits (i.e., a total of M ones and zeros). The M message bits may be message symbols from a larger alphabet. In the exemplary embodiment, however, the message bits are binary and composed of ones and zeros. The collection of M message bits forms the message word, which may be a randomly distributed set of M ones and zeros. The M message bits are encoded by encoder module 62 to form an N-bit code word. Typically, N is greater than M, but not necessarily. In one exemplary embodiment, the encoded message word, output from module 64, may be formed with M=92 and N=127. Another implementation of the encoded message word, for example, may be M=12 and N=24, as shown in FIG. 2.

The encoded message word from module 64 is sent to modulator 44, as shown in FIG. 8. The N-bit code word is modulated onto an optical carrier provided from CW laser 42. As an example, an electro-optic device may be used to modulate the intensity of a narrow frequency band of a laser beam output from CW laser 42.

By way of modulator 44, the encoded binary message word is transformed into waveforms that are compatible with characteristics of a communications channel (for example, the atmosphere). A key requirement, of course, for these waveforms is that they be distinguishable at digital receive optics 52. Accordingly, in one implementation, the presence of a "1" at the input of modulator 44 may result in the transmission of a certain kind of waveform (laser intensity versus time) and the presence of a "0" at the input to modulator 44 may result in the transmission of another type of waveform.

The waveforms for a "1" and a "0" may be represented by a predetermined number of equally spaced time samples. These samples may be sent in sequence to the electro-optic device (modulator 44) to intensity modulate the CW laser radiation and affect the transmission of the "1" and "0" waveforms. Exemplary waveforms for the "1" and the "0" may be a sine wave and its 180 degree shifted sine wave. Both waveforms are shown and discussed with reference to FIG. 5.

It will be appreciated that various modulation formats may be used in accordance with the present invention. For example, binary phase shift keying (BPSK), binary frequency shift keying (BFSK), and differential phase shift keying (DPSK) modulation formats may be utilized. The choice of modulation format depends on the communications channel through which the modulated CW laser beam is intended to propagate. One modulation format may, of course, be better than another modulation format. The best modulation format may be determined by experimentation.

The modulated CW laser signal output by modulator 44 may be amplified by optical amplifier 46. An exemplary optical amplifier may be an Erbium-doped fiber amplifier. Transmit optics 48 may be used to shape the amplified, modulated laser radiation into a desired spatial distribution and a desired direction of travel. For example, in one implementation a collimator may be used to form a slowly diverging beam of laser radiation.

Figure 3:
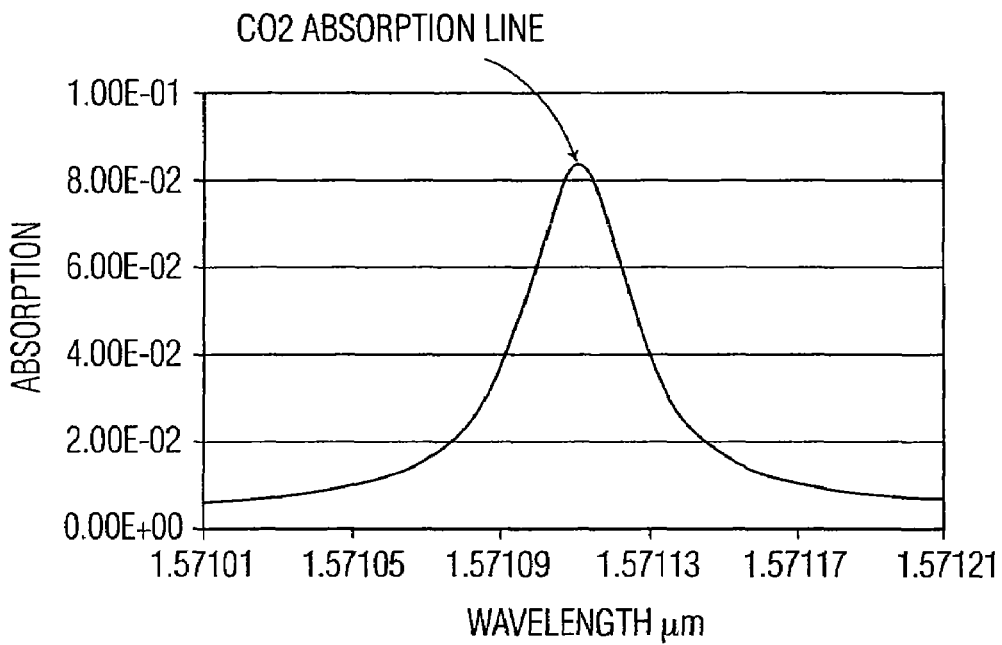
FIG. 3 is a plot of CO2 absorption line as a function of wavelength.

The amplified, modulated laser radiation is then propagated through the medium of interest, generally designated as 50. The medium may be a laboratory gas cell containing CO2 having a known absorption coefficient for laser radiation at a center wavelength of the absorption line. An exemplary center wavelength of an absorption line is shown in FIG. 3 for CO2. Of course, other gases may be used which have different absorption lines.

The transmitted laser radiation is intercepted by receive optics 52, as shown in FIG. 8. The laser radiation in a fielded-system may, of course, travel through the atmosphere, including propagation medium 50, and encounter a hard target. After the hard target is encountered, the laser radiation is reflected, propagated back through the medium, and returned to system 40. The received laser beam intensity (or power level) received by receive optics 52 depends on the transmitted laser wavelength and the geometry of the measurement.

The received laser radiation is detected by detector 54, which forms a voltage signal output proportional to the received laser intensity. As shown in FIG. 8, the output from detector 54 is sent to demodulator 68. The demodulator is shown as residing in processor 56. The detection process performed by detector 54 may include photo-detection, photocurrent, signal amplification, and electronic filtering. The detected analog signal is sampled and sent to demodulator 68, as further discussed with respect to FIGS. 9 and 10.

Demodulator 68 performs the inverse function of modulator 44. The demodulator determines, based on the input signal, whether a waveform representing a "1" or a waveform representing a "0" is sent through the propagation medium. The demodulator makes this determination on a bit by bit basis and requires bit synchronization for successful operation (synchronization between the transmit signal and the receive signal is known in the art and not shown in FIG. 8).

After the N-bit encoded word is collected in processor 56, the encoded word is decoded into an M-bit received message word by decoder 70. The decoder is also shown as residing in processor 56. The detection, demodulation and decoding processes are discussed in more detail with reference to FIGS. 9 and 10.

After decoding of the received message word, the decoded M-bit message word, from module 72, is sent to bit error accumulator 66. The M-bit message word, originally formed by module 60 and transmitted by transmit optics 48, is also sent to bit error accumulator 66. The bit error accumulator compares the received message word with the transmitted message word, on a bit by bit basis, and the number of bit errors is determined. The bit errors may be accumulated for a predetermined number of message word transmissions.

After the bit errors have been accumulated, for the predetermined number of message word transmissions, processor 56, by way of wavelength controller 58, modifies the laser wavelength of CW laser 42 in order to transmit a new CW laser signal. The same message word is encoded by module 62 and used to modulate the new CW laser wavelength by way of modulator 44. Again, after receiving and demodulating the new CW laser signal, the bit errors are accumulated and compared, on a bit by bit basis, by bit error accumulator 66 for the same predetermined number of message word transmissions.

This process may continue until the end of a desired wavelength scan is reached. When the end of the wavelength scan is reached, processor 56 may determine which wavelength produced the highest bit error rate (BER), as discussed previously with respect to FIG. 2. The highest bit error rate (BER) identifies an absorption line of propagation medium 50.

Figure 9:
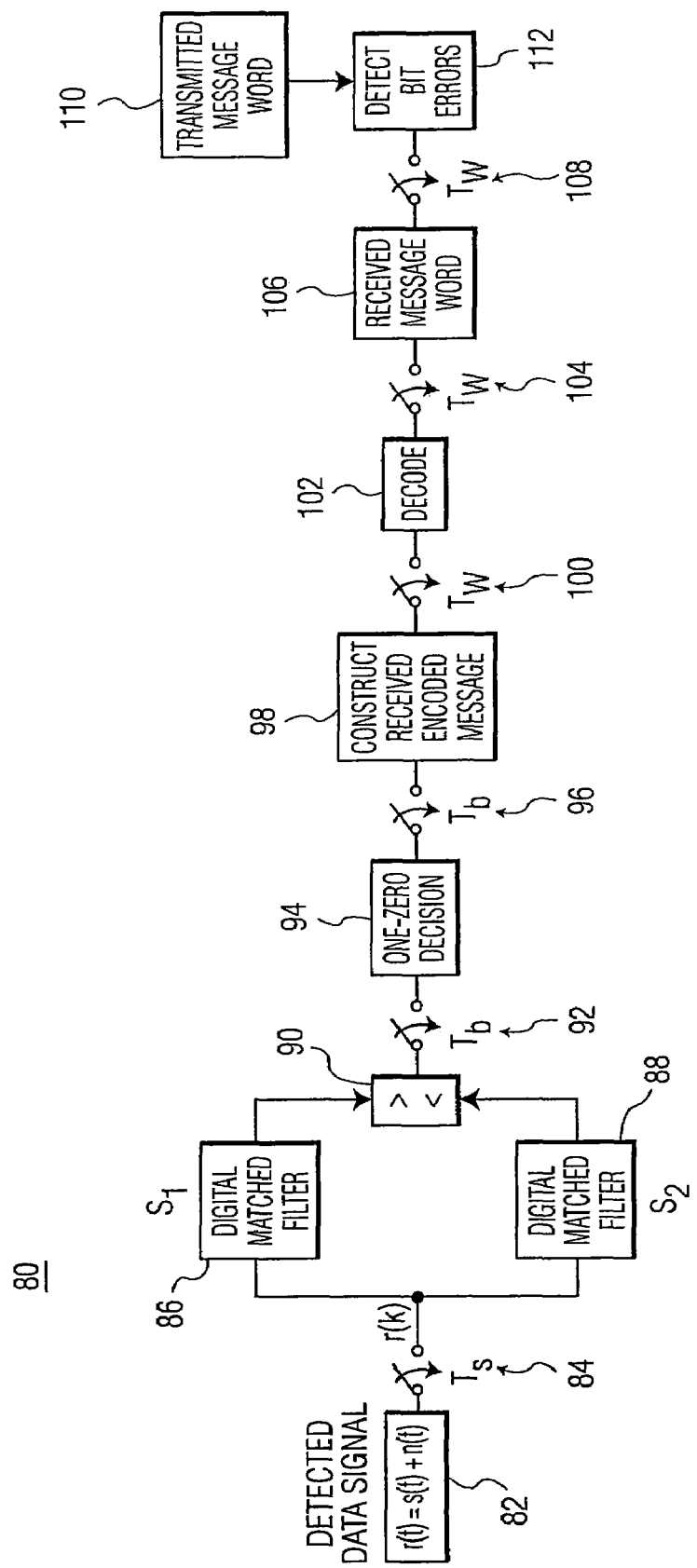
FIG. 9 is a block diagram of another embodiment of a digital LIDAR/LADAR system using a digital communications architecture, including digital matched filters for processing the received digital signal, in accordance with an embodiment of the invention.

Referring now to FIG. 9, there is shown an exemplary digital receiver used for the BER-based optical detection. The digital receiver, generally designated as 80, shows in greater detail, various processing modules of processor 56 (FIG. 8). As shown in FIG. 9, the detected data signal (output from detector 54) includes a signal component and a noise component received by module 82. The detected data signal is sampled at a rate of $1/T_s$, where Ts is the sampling duration of the transmitted/received signal waveforms. As discussed previously, the "1" and "0" waveforms (S1 waveform and S2 waveform, in general) are sent to modulator 44 to modulate the CW laser signal.

Sampling is performed by switch 84 at a sampling rate of $1/T_s$. As shown in FIG. 9, the sampled data signal, r(k), is sent simultaneously to digital matched filter 86 and digital matched filter 88. Assuming that the number of samples per each bit is Q, then Q samples may be read into each digital matched filter (DMF) 86 and 88. After Q samples are read into each DMF, the outputs of DMF 86 and DMF 88 may be compared by module 90, as shown.

If the output of DMF 86, matched to the S1 waveform, is larger than the output of DMF 88, then a "1" is presumed to have been sent/received. If the output of DMF 88, matched to the S2 waveform, is larger than the output of DMF 86, however, then a "0" is presumed to have been sent/received. Switch 92 is closed momentarily at a sampling rate of $1/T_b$, where $T_b$ is bit duration. After each one bit duration of $T_b$ elapses, module 94 forms a 1/0 decision. The 1/0 decision is made on a bit by bit basis.

Although not shown in FIG. 9, it will be appreciated that digital receiver 80 may first achieve signal synchronization by correlation/detection of a synchronization word. This synchronization word may be a preamble, maximal length, PN word that precedes the M-bit message word or the N-bit encoded message word. Resynchronization must be performed for each change of laser radiation wavelength affected by wavelength controller 58 (FIG. 8). Thus, for each laser radiation wavelength, transmitted through the medium of interest, the waveform sent actually includes a synchronization word that is followed by a predetermined number of message words.

Each 1/0 decision is made after $T_b$ bit duration ($T_b=Q*T_s$, where Q is the number of samples per bit and Ts is the sample duration). This continues until all N-bits have been determined. Recall that there are N-bits for each encoded message word. The encoded message is reconstructed by module 98, on a bit by bit basis, as switch 96 samples each bit. After N bits have been reconstructed by module 98, the entire N-bit encoded message is present in module 98.

The N-bit encoded message is decoded by decode module 102 into M message bits. After decoding by module 102, the M message bits are stored in module 106. Switches 100, 104 and 108 are closed momentarily at a sampling rate of $1/T_w$, where Tw is an encoded word duration, also defined as $N*Q*T_s$. The decoded, received message word is stored in module 106. This received message word is compared with the transmitted message word of module 110 by error detection module 112. The comparison may be performed on a bit-by-bit basis, so that each bit error may be counted.

The process of comparing and detecting bit errors by module 112 may be continued for a predetermined number of message words. After the predetermined number of message words have been compared, processor 56 (shown in FIG. 8), by way of wavelength controller 58, modifies the wavelength output of CW laser 42. This process may be continued until the end of the laser wavelength scan is reached.

It will be appreciated that sampling switches 84, 92, 96, 100, 104 and 108 (as well as other sampling switches shown in FIGS. 10, 12, 13 and 18) may be digital switches controlled by processor 56, for example.

Figure 10:
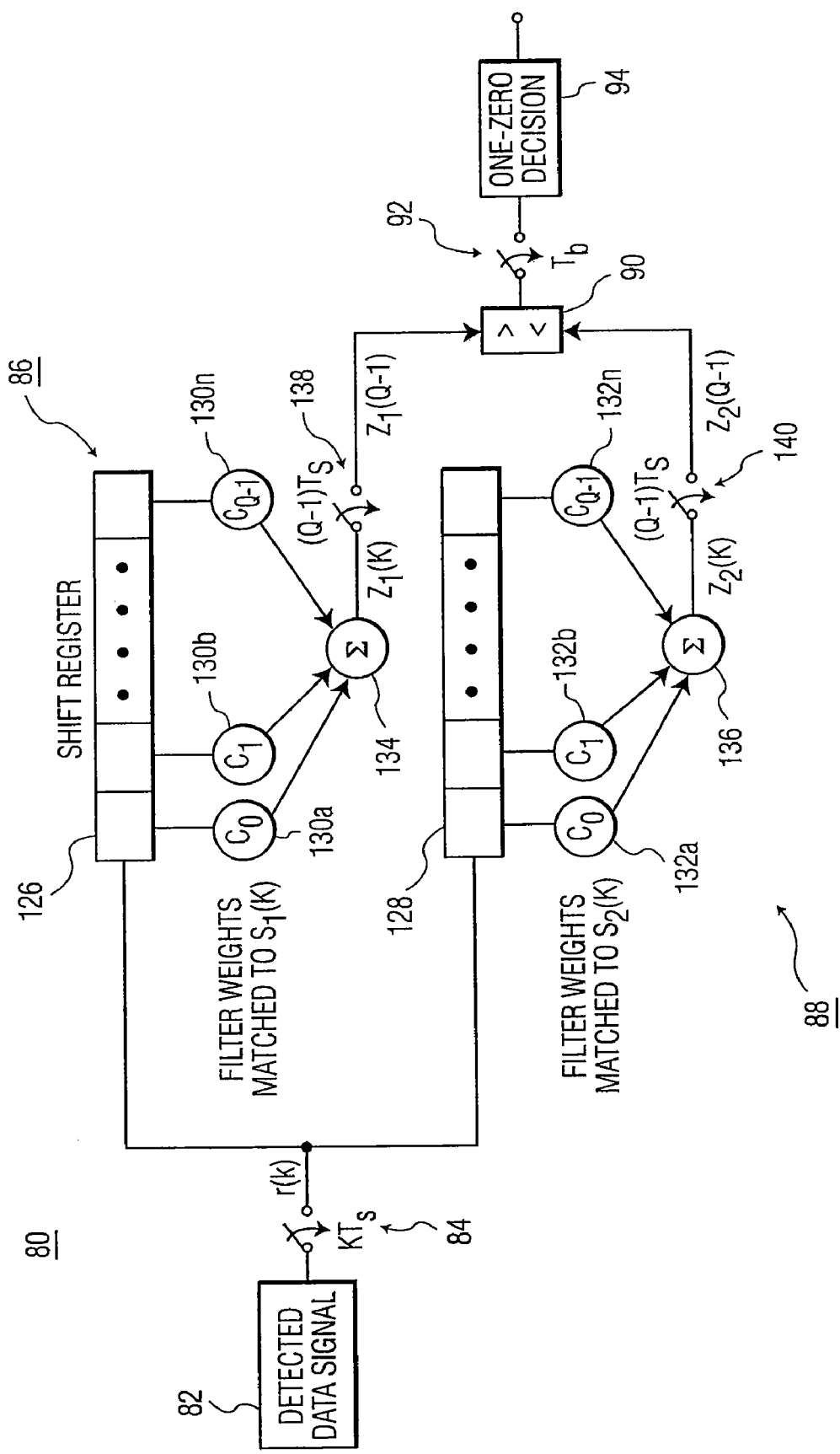
FIG. 10 is a more detailed block diagram of the digital matched filters of FIG. 9, in accordance with an embodiment of the invention.

The digital matched filters (86 and 88) of FIG. 9 are shown in greater detail in FIG. 10. As shown, processor 80 includes shift register 126 and shift register 128. Each shift register is combined with weighting coefficients that are matched to input modulation waveforms $S_1$ or $S_2$. Weighting coefficients matched to the $S_1$ waveforms are $C_0, C_1, \ldots C_{Q-1}$, designated generally as 130a, 130b and 130n, respectively. Similarly, weighting coefficients matched to the $S_2$ waveform are $C_0$, $C_1, \ldots C_{Q-1}$, designated generally as 132a, 132b and 132n, respectively.

The contents of shift register 126 and shift register 128 are multiplied by their respective weighting coefficients, and then added together, respectively, by adders 134 and 136 to form separate outputs $Z_1(k)$ and $Z_2(k)$. Separate outputs $Z_1(k)$ and $Z_2(k)$ from digital matched filter 86 and digital matched filter 88 are compared after Q samples have been read. The input to comparator 90 is provided by way of sampling switches 138 and 140. The larger output signal from digital matched filter 86 or digital matched filter 88 is presumed to indicate which waveform was transmitted. After Q samples have been read, if for example, $S_1$ was transmitted, the output of the digital matched filter 86 matched to $S_1$ corresponds to a peak correlation between the received signal and a replica of $S_1$. If for example, $S_2$ was transmitted, the output of digital matched filter 88 matched to $S_2$ corresponds to a peak correlation between the received signal and a replica of $S_2$.

It will be appreciated that the signal to noise ratio of a digital matched filtered is optimal when matched to a signal passing through a linear system and corrupted by additive white Gaussian noise. FIG. 10 may also be better understood by the following set of equations corresponding to portions of the digital matched filter architecture:

$$\text{SHIFT REGISTER LENGTH} = Q = \frac{\text{\# SAMPLES}}{\text{bit}}$$

$$r(k) = s(k) + n(k), k = 0, 1, 2, \ldots$$

$$Z(k) = \sum_{n=0}^{Q-1} r(k-n)C_n, k = 0, 1, 2, \ldots$$

$$C_n = S_i(Q-1-n), i = 1, 2.$$

$$Z_i(Q-1) = \sum_{n=0}^{Q-1} r(Q-1-n)S_i(Q-1-n)$$

Figure 11:
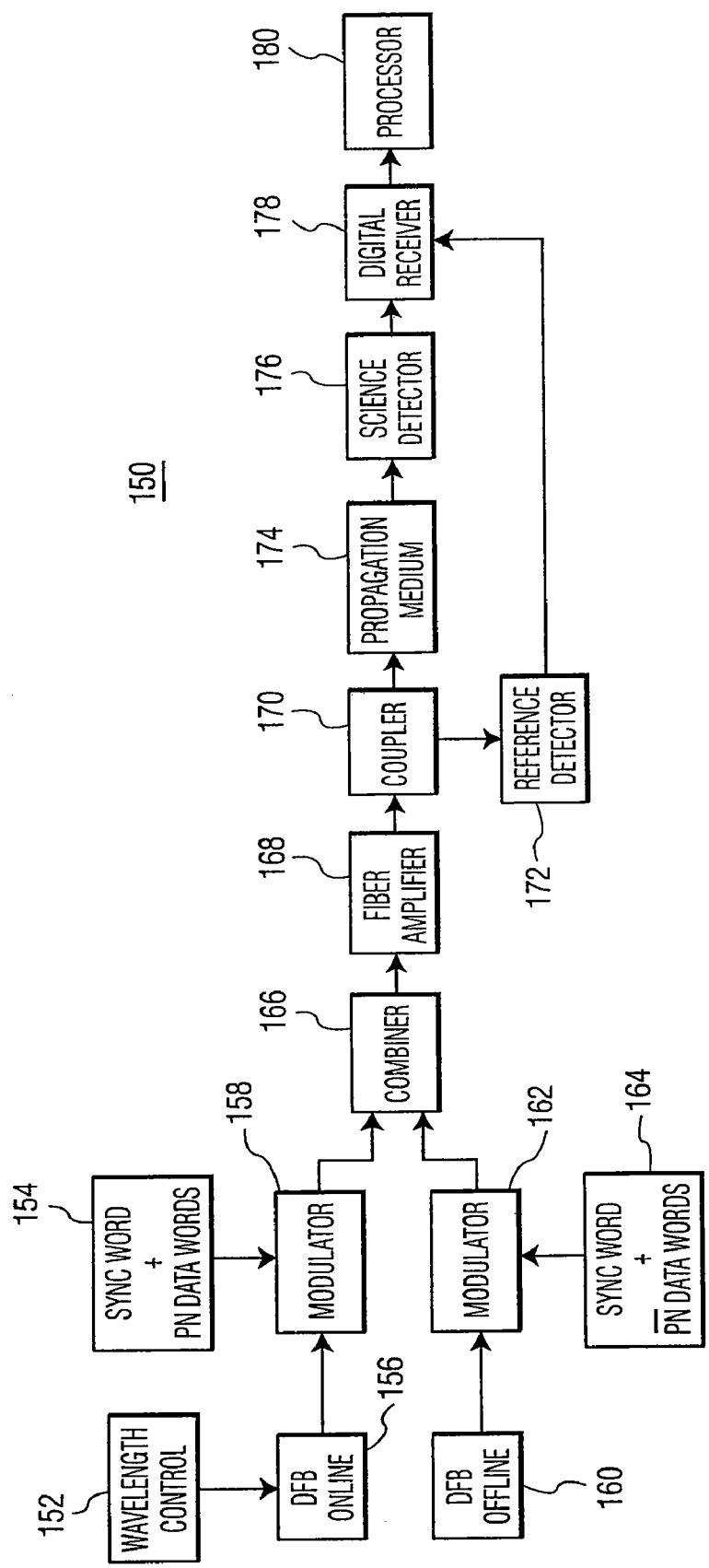
FIG. 11 is a block diagram of yet another digital LIDAR/LADAR system using a digital communications architecture, including two digitally modulated carriers, the first modulated by a PN encoded signal and the second modulated by an orthogonal PN encoded signal (PN'), in accordance with an embodiment of the invention.

Another exemplary embodiment of the invention is shown in FIG. 11. As shown, system 150 provides measurement of optical properties of a medium. System 150 includes a transmitting portion and a receiving portion. The transmitting portion may include wavelength controller 152, online distributed feedback (DFB) laser 156, sync and PN data words module 154, modulator 158, DFB offline laser 160, modulator 162, sync and PN' data words module 164, combiner 166, fiber amplifier 168 and coupler 170. The receiving portion may include science detector 176, reference detector 172, and digital receiver 178. Processor 180 may be included in both the receiving portion and the transmitting portion. The output of coupler 170 may be transmitted through propagation medium 174 and received by science detector 176.

Figure 14:
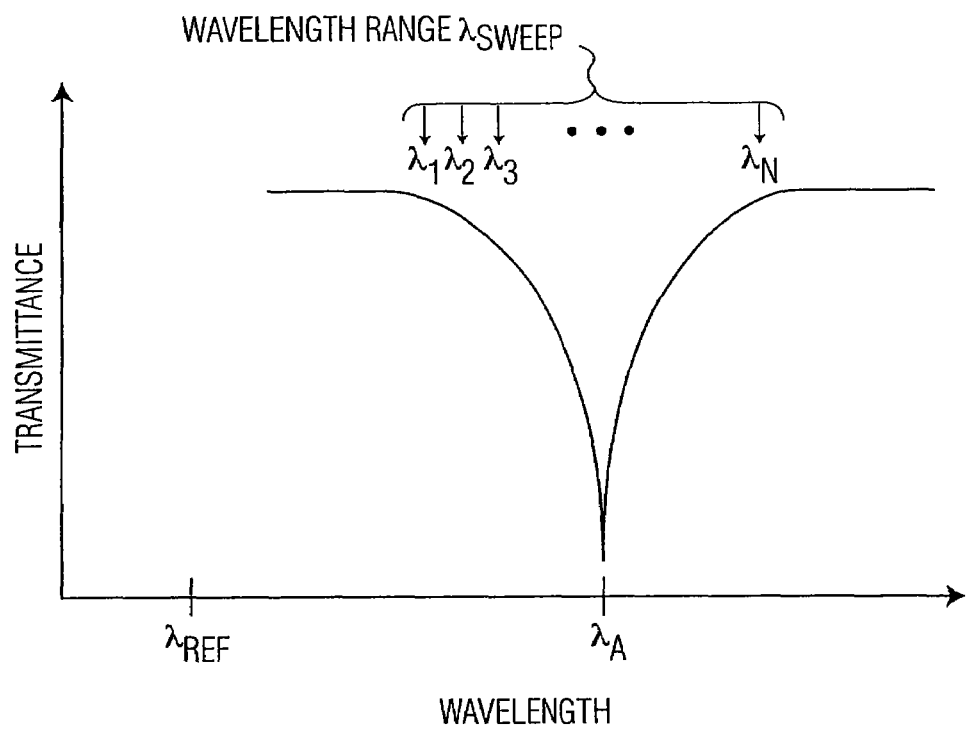
FIG. 14 is a plot of transmittance versus wavelength, showing an exemplary wavelength range used to discretely vary the wavelength of the online laser of FIG. 11, in accordance with an embodiment of the invention.

Wavelength controller 152 may vary the output wavelength of DFB online laser 156 over a range of wavelengths. In one implementation consistent with the principles of the invention, DFB online laser 156 may be configured to scan (or sweep) the output wavelength over a range of wavelengths, as shown in FIG. 14. That is, DFB online laser 156 may sequentially output discrete wavelengths within the sweep range, as shown, during a predetermined period (or inverse of sweep frequency). One exemplary sweep frequency may be approximately 10 hertz, although this is merely an example and other sweep frequencies may be employed.

Wavelength controller 152 may be configured to control the wavelength produced by tunable DFB online laser 156, for example, by varying the current that drives tunable laser 156, or by varying the temperature of tunable laser 156. In turn, wavelength controller 152 may receive feedback signals from tunable online laser 156 to aid in the sweep of the laser. The wavelengths of the emitted radiation may fall in the ultraviolet, visible, short wavelength infrared (SWIR), mid wavelength infrared (MWIR), long wavelength infrared (LWIR), or any other electro magnetic region suitable for active remote sensing. Optics (not shown) may be configured to direct the emitted radiation to modulator 158.

The operation of system 150 may be further described with respect to FIG. 14. The figure is a plot of transmittance versus wavelength for an exemplary sample material having a spectral feature of interest. In some implementations, the spectral feature of interest may be an absorption line, such as center absorption wavelength $\lambda_A$. Wavelength controller 152 may cause the output wavelength of laser 156 to vary along the wavelength range $\lambda_{SWEEP}$ at some sweep frequency. The wavelength range of $\lambda_{SWEEP}$ may include the entire spectral feature of interest and may extend to wavelengths on either side of the spectral feature of interest (or may just extend far enough in wavelength to include the spectral feature of interest). Those skilled in the remote sensing art understand how far beyond the spectral region occupied by the spectral feature of interest the wavelength range of $\lambda_{SWEEP}$ may extend.

Still referring to FIG. 11, modulator 158 may include an electro-optic (EO) modulator configured to impart modulation to the output of online laser 156. The modulation may be digital message words provided by module 154. Continuing the description, DFB offline laser 160 may provide a fixed output wavelength, such as $\lambda_{REFERENCE}$, as shown in FIG. 14. Modulator 162 may modulate the fixed wavelength output from offline laser 160 by using digital message words formed by module 164. These digital message words provided by modules 154 and 164 will be explained in greater detail later.

The online modulated signal and the offline modulated signal may be combined by combiner 166. The combined optical signal may be amplified by fiber amplifier 168 and passed through optical coupler 170. A small fraction of the net signal may be split off to reference detector 172. The reference detector may include a photodetector, amplifier and an electronic filter. The resulting reference signal may then be routed to digital receiver 178 and processor 180.

The remaining portion of the net optical signal may be radiated through transmission optics (not shown) and into propagation medium 174. The net optical signal traverses the propagation medium, where it may undergo several transformations. First, the online and offline portions of the beam may be amplitude modulated in a random fashion by turbulence, time dependent target reflectivity, speckle effects, vibration misalignment effects, and so forth. Because the online and offline wavelengths are nearly identical, these noise effects may be superimposed in nearly equal fractional gain on the online and offline components of the net propagating laser beam. Secondly, both the online and offline beams may suffer the same fractional losses due to radiometric effects (space losses due to propagation). Thirdly, and most importantly, the online component of the beam may suffer more absorption due to the presence of a gas of interest, than the offline component of the beam.

The composite laser beam may be collected, after passage through propagation medium 174 by receiver optics (not shown) and routed to science detector 176. The science detector may include a photo-detector, amplifier and electronic filter to produce an analog voltage signal routed to digital receiver 178. The digital receiver may simultaneously sample each signal from the science detector and reference detector at a rate equal to the sampling rate of the transmitted digital message words.

After synchronization is accomplished, by using each sync word from modules 154 and 164, digital receiver 178 may operate on the sequence of data words produced by modules 154 and 164. The processor 180 may also operate on the sequence of data words, one word at a time, to extract a measurement of the relative transmission of the online and offline signal components of the received laser radiation. These operations are discussed in greater detail with respect to FIGS. 12 and 13. As will be explained, the relative transmission may be expressed as a ratio of the science detector online correlation peak and the science detector offline correlation peak, normalized by the same ratio extracted from the reference detector channel. This process may be continued for a predetermined number of data words, after which the wavelength controller may modify the wavelength output by online laser 156. The process may be continued until the end of the laser wavelength scan (sweep) is reached. It will be appreciated that resynchronization, using a sync word provided from module 154 and another sync word provided from module 164, may be provided for every discrete wavelength output by online laser 156.

Figure 12:
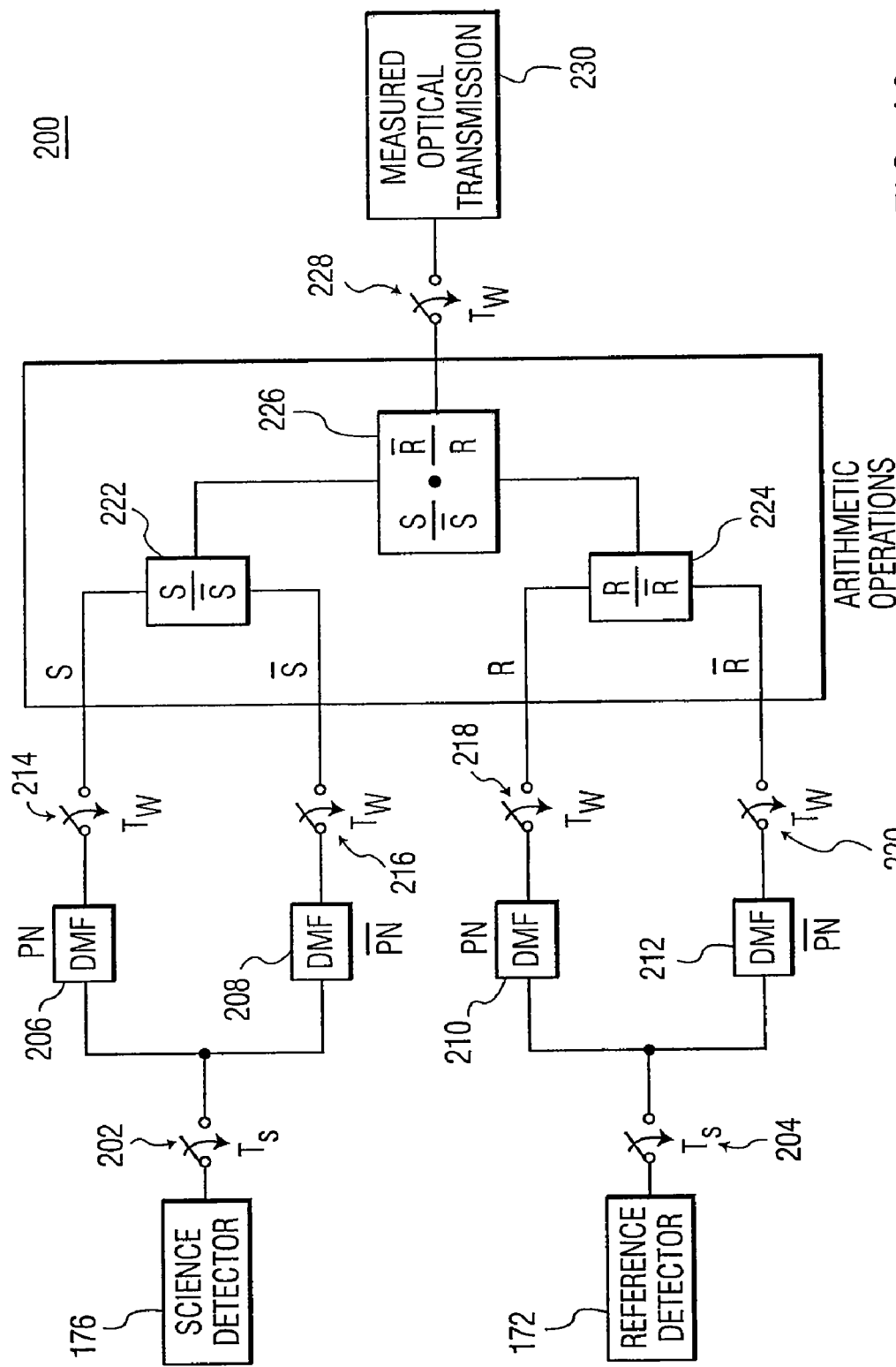
FIG. 12 is a block diagram showing detail of a digital correlation processing method that is provided by the system of FIG. 11, in accordance with an embodiment of the invention.
Figure 13:
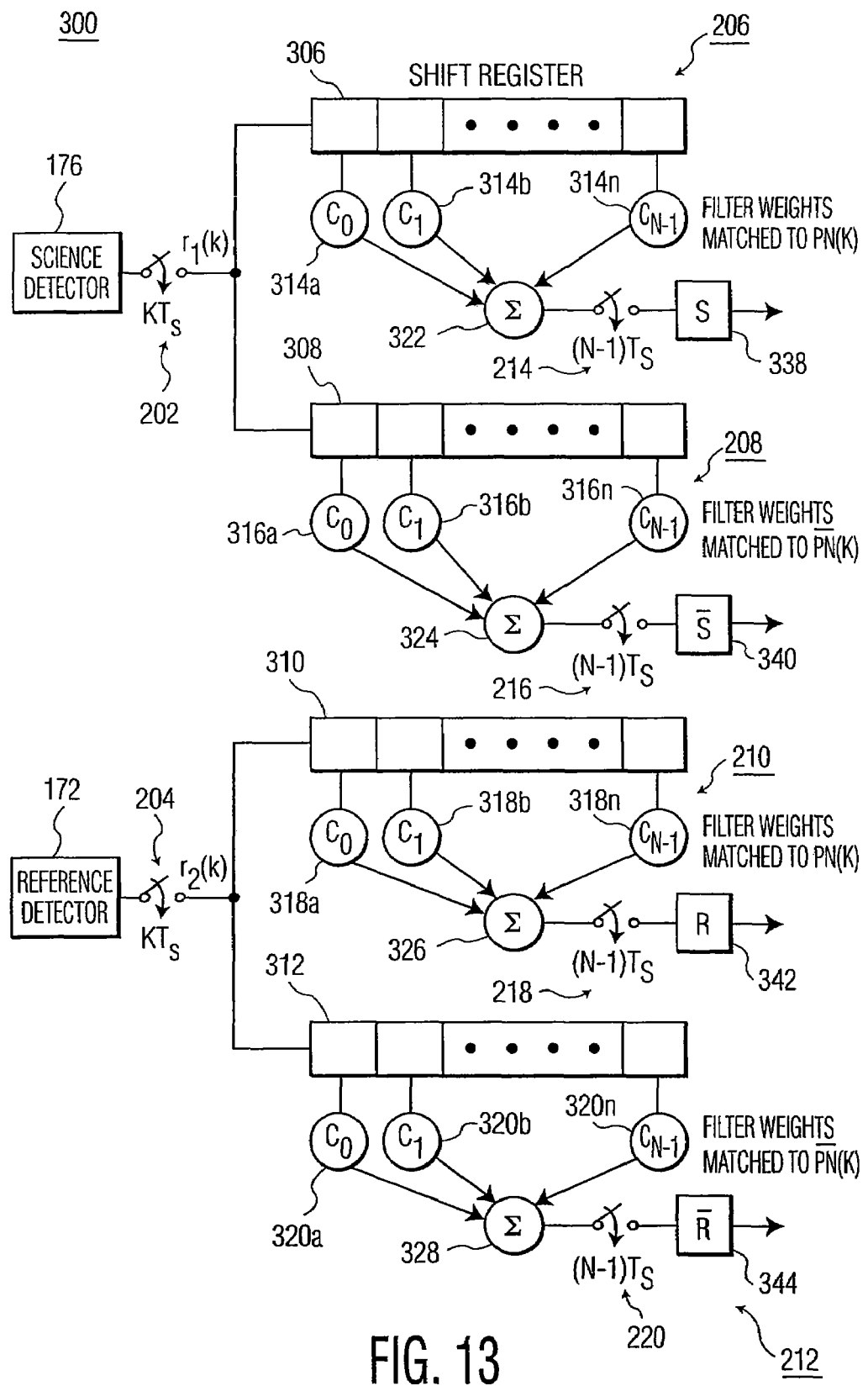
FIG. 13 is a block diagram showing greater detail of the digital matched filters of FIG. 12, in accordance with an embodiment of the invention.

The digital message words, selected by module 154 and module 164 for the online and offline laser wavelengths, respectively, will now be explained. The online digital message may include a preamble synchronization word, followed by a predetermined number of identical data words. The synchronization word and the data words may be maximal length, pseudonoise (PN) code words. Each PN code word may include a predetermined number of bits. The offline digital message may include the same synchronization word, followed by a predetermined number of identical maximum length PN' code words (PN' is orthogonal to PN; PN' is shown in FIGS. 11-13 as PN with a bar on top). The online and offline maximal length, code words may be made orthogonal to each other, by forming the offline code word, PN', from a cyclically shifted version of the online code word, PN.

As previously described with respect to FIG. 8, digital modulation by way of modulators 158 and 162 is a process in which digital symbols (1/0) are transformed into waveforms that are compatible with the characteristics of a communications channel. As an example, the communications channel may be the atmosphere, a channel under water, or a laboratory cell. In one implementation, the presence of a "1" at the modulator input results in a waveform that varies the laser intensity as a function of time, and the presence of a "0" at the modulator input results in a transmission of another type of waveform that varies the laser intensity as a function of time. The waveform for a "1" or a "0" may be represented by a predetermined number of equally spaced time samples. These samples may be sent in sequence to each modulator to intensity modulate the laser radiation and affect the transmission of a "1" or a "0" waveform.

The digital receiver and processor of FIG. 11 will now be described in greater detail with reference to FIGS. 12 and 13. Referring first to FIG. 12, system 200 includes science detector 176 and reference detector 172. The output from science detector 176 is switched by way of switch 202 to digital matched filter 206 and digital matched filter 208. Similarly, the output from reference detector 172 is switched by way of switch 204 to digital matched filter 210 and digital matched filter 212.

Digital matched filters 206 and 210 are matched to the PN waveform. Digital matched filters 208 and 212 are matched to the orthogonal waveform of PN'. The PN is the online signal word and the PN' is the offline signal word. PN and PN' may be orthogonal, maximal length, PN code words.

As shown in FIG. 12, the detected science and reference data word signals may be sampled simultaneously, by way of switches 202 and 204, respectively, at a rate of $1/T_s$, where $T_s$ is the sampling duration of the transmitted signal waveform. As previously described, assuming that the number of samples per bit waveform is Q and the number of bits per PN data word is P, then Q*P samples are read into each digital matched filter (DMF). After the Q*P samples are read into each DMF (206, 208, 210 and 212), the output of each DMF is sampled. For the science channel, the output S of the DMF, matched to PN, is a measure of the effect of propagation through a medium of interest on the online signal component. The output S' of the DMF, matched to PN', is a measure of the effect of propagation through the medium of interest on the offline signal component. Similarly, for the reference channel, the output R of the DMF, matched to PN, is a measure of the transmitted online signal power. The output R' (shown in FIGS. 12 and 13 as R with a bar on top) of the DMF, matched to PN', is a measure of the transmitted offline signal power.

The outputs of S, S', R and R' are formed, as shown, after Q*P samples have been read into each DMF. The sampling is performed, by way of switches 214, 216, 218 and 220. Each of these switches may be closed momentarily at a sampling rate of 1/Tw, where Tw is the encoded word duration.

As shown, module 222 forms a ratio of S to S' (shown in FIGS. 12 and 13 as S with a bar on top). Module 224 forms a ratio of R to R'. Module 226 forms a normalized power product of each data word that is equal to the measured value of the relative transmission of the online and offline laser beam components. It is noted that the normalized power product is formed by multiplying the output from module 222 with the inverse of the output from module 224.

Measuring module 230 may measure the normalized power product provided from module 226 by way of sampling switch 228. It will be appreciated that the measurement may be performed for each data word, or may be averaged over a predetermined number of data words to determine a mean relative atmospheric transmission.

In one implementation, measuring module 230 may process the data to find a single relative transmission value by forming a ratio after summing the outputs of the DMFs for the predetermined number of data words. This may be shown mathematically as follows:

$$\tau = \frac{\sum_{i=1}^{NDATA} S_i}{\sum_{i=1}^{NDATA} S'_i} \cdot \frac{\sum_{i=1}^{NDATA} R'_i}{\sum_{i=1}^{NDATA} R_i},$$

where $\tau$ is the single relative transmission value, and

NDATA is the predetermined number of data words processed per wavelength.

Measurements may be continued for the predetermined number of data words, after which the wavelength of online laser 156 may be changed. Another measurement may then be taken for the predetermined number of data words. This process may be continued until the end of the scan is reached. It will be appreciated that after each change of wavelength, the system may need to be resynchronized by providing new sync words, by way of modules 154 and 164, respectively, of FIG. 11.

The digital matched filters of FIG. 12 are shown in greater detail in FIG. 13. As shown, DMF 206 includes shift register 306 combined with weighting coefficients $C_0, C_1 \ldots C_{N-1}$, respectively designated as 314a, 314b and 314n. The shift register contents are multiplied by the weighting coefficients, and added together by adder 322 to form an output. The length of shift register 306 may be Q*P, where P is the number of bits per PN code word, and Q is the number of samples per bit.

The output of adder 322 may be sampled, after an entire PN data word (i.e., Q*P samples) have been read. The sampling may be performed by switch 214, which may be closed momentarily after the samples for the data word have been read. The output S from switch 214 may be placed in module 338.

In a similar manner, DMF 208 includes shift register 308 combined with weighting coefficients that are designated as 316a, 316b and 316n. The shift register contents are multiplied by these weighting coefficients, added together by adder 324, and output by way of sampling switch 216 to form S' (shown as S with a bar on top) in module 340. Similarly, DMF 210 includes shift register 310 combined with weighting coefficients that are designated as 318a, 318b and 318n. The output of shift register 310 are multiplied by these weighting coefficients, and added together by adder 326 to form output R in module 342, by way of sampling switch 218. Lastly, DMF 212 includes shift register 312 combined with weighting coefficients that are designated as 320a, 320b and 320n. After multiplication, adder 328, by way of sampling switch 220, provides output R' (shown as R with a bar on top) for placement in module 344.

FIG. 13 may also be understood by reference to the following equations:

$$C_n = S_i(N-1-n), i=1, 2.$$

where $$S_1(k) = PN(k), k=0, 1, 2, \ldots, N-1$$

$$S_2(k) = PN'(k)$$

SHIFT REGISTER LENGTH=N $$N = \left(\frac{\# \text{ SAMPLES}}{\text{BIT}}\right) \times \left(\frac{\# \text{ BITS}}{PNWORD}\right)$$

MEASUREMENT OUTPUTS:

$$S = \sum_{n=0}^{N-1} r_1(N-1-n)PN(N-1-n)$$

$$S' = \sum_{n=0}^{N-1} r_1(N-1-n)PN'(N-1-n)$$

$$R = \sum_{n=0}^{N-1} r_2(N-1-n)PN(N-1-n)$$

$$R' = \sum_{n=0}^{N-1} r_2(N-1-n)PN'(N-1-n)$$

It will be appreciated that the matched filter approach shown in FIG. 13 using an entire PN code word message may be sufficiently robust to achieve good performance in a turbulent atmosphere. It will further be appreciated that the signal to noise ratio of a digital matched filter may be optimal when matched to a signal passing through a linear system and corrupted by additive white Gaussian noise.

Figure 15:
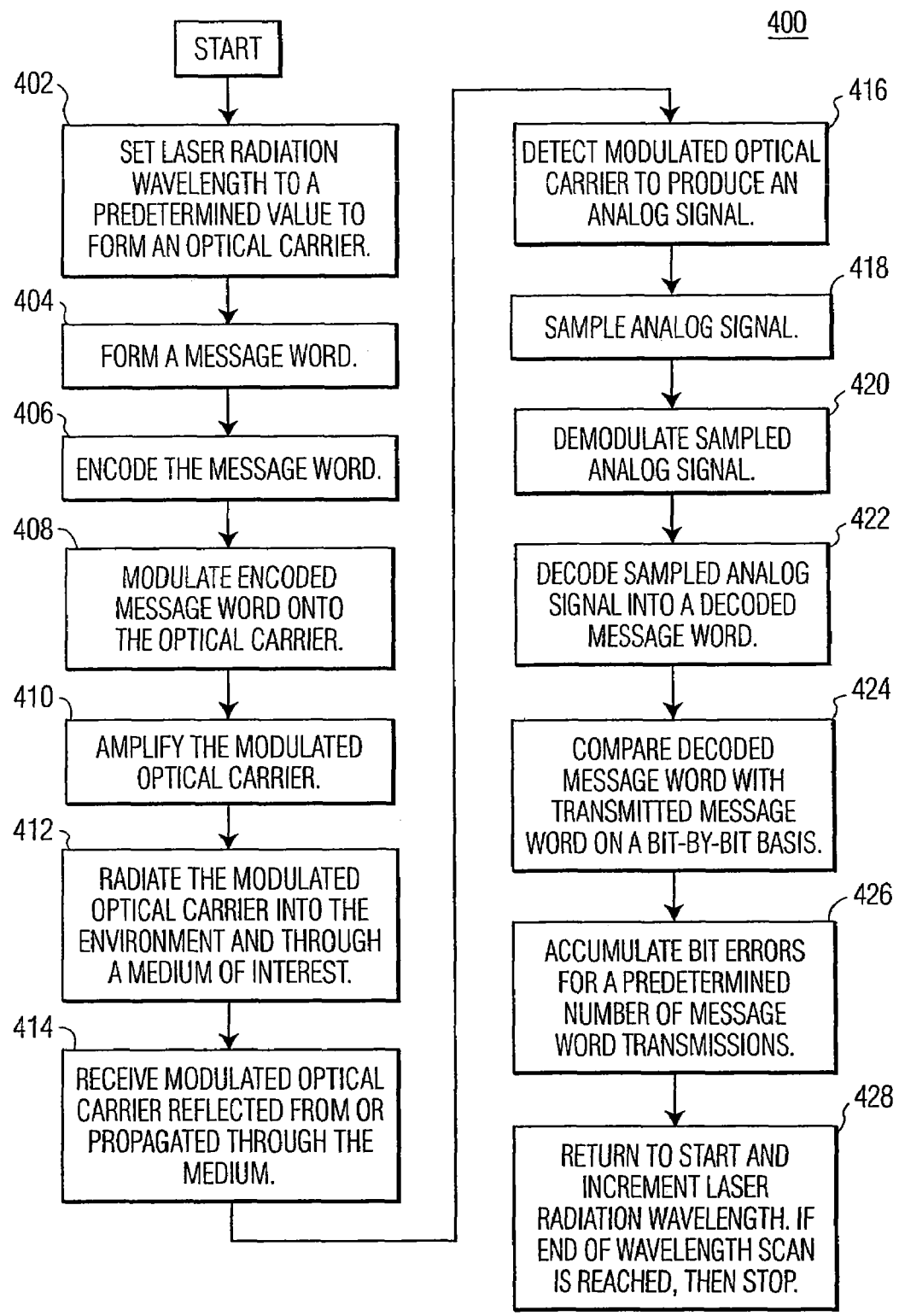
FIG. 15 is a flow block diagram of a BER-based detection method, as executed by an embodiment of the present invention.

Referring now to FIG. 15, there is shown a flow diagram of a BER-based detection method. The method, generally designated as 400, will now be described, in connection with previously described FIG. 8. The method begins at step 402 and sets a laser radiation wavelength for CW laser 42. Step 404, by way of processor 56, forms a message word. The message word is encoded by encoder 62 in step 406. Next, step 408 modulates the encoded message word from module 64 onto the output of CW laser 42. The modulated optical carrier is amplified in step 410, by way of optical amplifier 46.

The method continues to step 412, and radiates the modulated optical carrier into the environment (the atmosphere, for example). The radiation is performed by transmit optics 48 through propagation medium 50. Step 414 receives the modulated optical carrier by way of receive optics 52, after it is reflected from, or propagated through, the medium.

Method 400 next, by way of step 416, detects the modulated optical carrier to form an analog signal. Step 418 next samples the analog signal. The detection and sampling is performed, for example, by way of receive optics 52 and detector 54.

The method then demodulates the sampled analog signal by way of step 420. The demodulation may be performed by processor 56 using, for example, digital matched filters 86 and 88 (FIG. 9). Step 422 decodes the sampled analog signal to form a decoded message word. This step may be performed by decoder 70. Performing step 424, method 400 compares the decoded message word with the transmitted message word on a bit-by-bit basis. This step may be performed, for example, by bit error accumulator 66 upon comparing the received message word placed in module 72 with the transmitted message word placed in module 60. The bit errors may be accumulated for a predetermined number of message words in step 426. As previously described, each message word may be identical with any other message word during the transmission.

Method 400 branches to step 428 and returns to the start of the method, in order to increment the laser radiation wavelength, by way of wavelength controller 58. This incremental wavelength may be, for example, as shown in FIG. 14, one of the discrete wavelengths of $\lambda_1, \lambda_2, \lambda_3$, etc., up to the end of the wavelength scan designated as $\lambda_N$. Method 400 then repeats steps 402 through 428. If the end of the wavelength scan is reached (for example, $\lambda_N$ has been radiated, received, detected and accumulated as bit errors), then the method stops.

Figure 16:
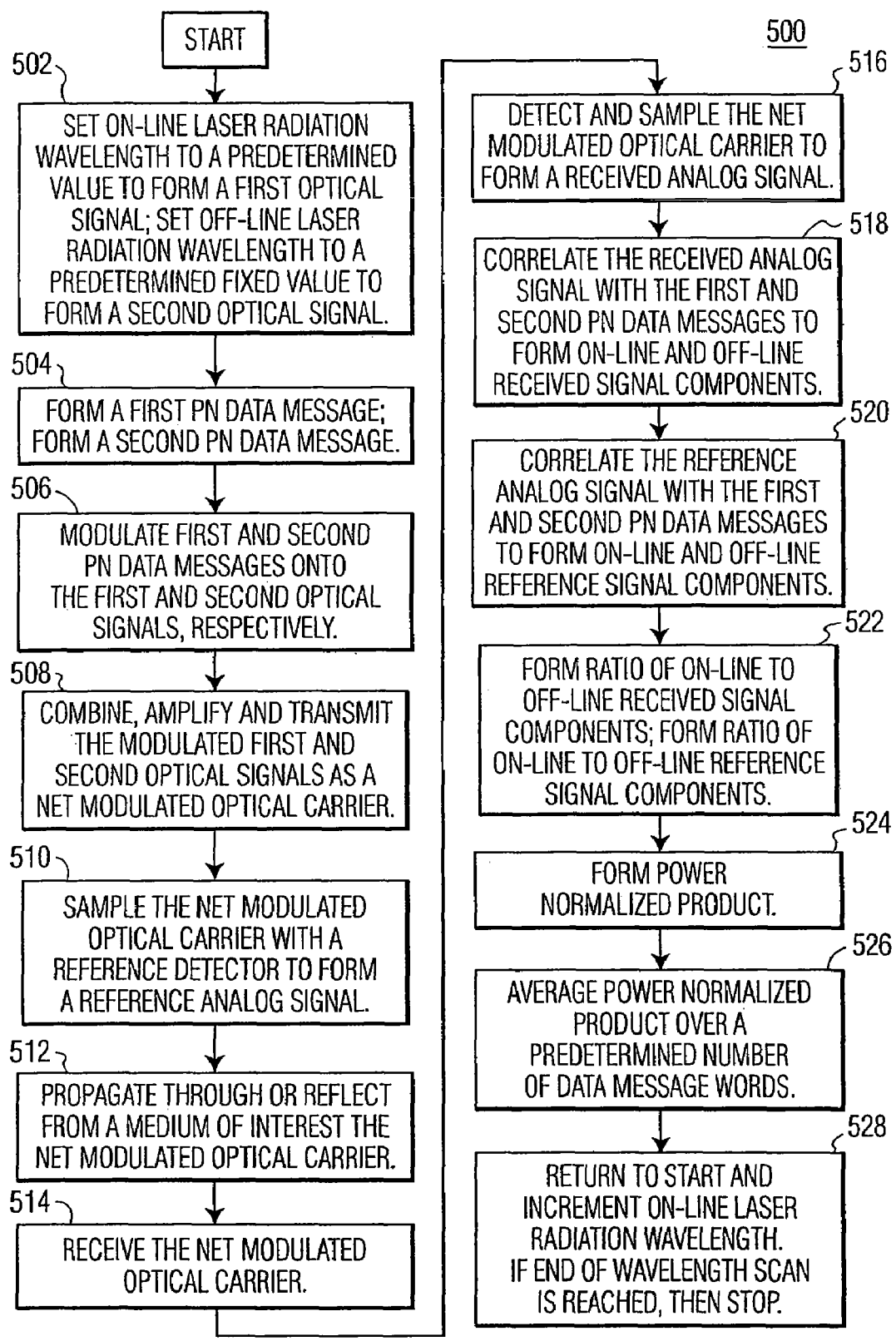
FIG. 16 is a flow block diagram of a correlation-based detection method, as executed by another embodiment of the present invention.

Referring next to FIG. 16, there is shown a flow diagram of a method for detecting properties of a medium of interest using a correlation-based system. The method, generally designated as 500, will now be described in connection with the system previously described with reference to FIG. 11. Method 500 begins at step 502 and sets the online laser radiation wavelength to a predetermined value to form a first optical signal. This first optical signal may be, for example, any one of the discrete wavelengths shown in FIG. 14.

Similarly step 502 sets the offline laser radiation wavelength to a predetermined fixed value to form a second optical signal. The second optical signal may be, for example, wavelength $\lambda_{REFERENCE}$ shown in FIG. 14. As previously described with respect to FIG. 11, the online laser radiation wavelength is set by way of wavelength controller 152 and the offline laser radiation wavelength is fixed as a predetermined value in offline laser 160. It will be understood that online laser 156 and offline laser 160 each output a CW carrier signal.

Step 504 forms a first PN data message by way of module 154 and forms a second PN data message (PN') by way of module 164. Step 506 modulates the first and second PN data messages onto the first and second optical signals, respectively. These modulations may be performed by modulators 158 and 162. Method 500 then, by way of step 508, combines, amplifies and transmits the modulated first and second optical signals as a net modulated optical carrier. Step 506 may be implemented by way of combiner 166 and fiber amplifier 168.

Step 510 samples the net modulated optical carrier using reference detector 172, for example, to form a reference analog signal for digital receiver 178. Most of the net modulated optical carrier, however, is propagated into the medium of interest, by way of step 512.

Step 514 receives the net modulated optical carrier. Step 516 detects and samples the net modulated optical carrier to form a received analog signal. These steps may be performed by way of science detector 176. Method 500, using step 518, then correlates the received analog signal with the first and second PN data messages (PN data message and PN' data message) to form the online and the offline received signal components. Method 500 also correlates the reference analog signal with the first and second PN data messages (PN data message and PN' data message), in step 520, to form the online and the offline reference signal components. These steps may be performed by way of digital receiver 178 and processor 180. The digital receiver samples both the science and reference detector signals simultaneously, at a rate equal to the sampling rate of the transmitted digital messages.

Step 522 then forms a ratio of the online to the offline received signal components, and forms another ratio of the online to the offline reference signal components. Formation of these ratios is shown, for example, in FIG. 12, after these ratios have been placed into module 222 and module 224. Method 500 next forms a power normalized product, by way of step 524. An example of a power normalized product is shown in FIG. 12, after this product has been placed into module 226.

In one implementation, as shown in FIG. 16, methods 500 averages the power normalized product over a predetermined number of data message word, by way of step 526. The method, by way of step 528, returns to the start and increments the online laser radiation wavelength, as previously described. If the end of the wavelength scan is reached, method 500 stops.

As previously described, the online laser radiation wavelength is set to some desired starting value, for example, $\lambda_1$ of FIG. 14. This wavelength may be discreetly swept across an absorption line of interest. Such wavelengths of interest are shown, for example, as $\lambda_1$, $\lambda_2$, etc., up to the end of scan of $\lambda_N$. One cycle of steps 502 through 528 may be performed for each discrete wavelength in the scan.

The aforementioned figures have shown various approaches for detecting, identifying, and measuring optical properties of a medium of interest using communication architectures. These communication architectures (for example system 10, system 20, system 40, and system 150) may be configured using lasers that generate continuous laser beams, or CW optical carriers. These CW beams, reflected from the medium of interest, may be detected by each of these architectures. Because of the digital processing, as exemplified by these architectures, the returned beam advantageously provides a much needed signal-to-noise ratio. Moreover, small, low power, light weight, continuous fiber lasers may be used. The system optics are advantageously simple, cost effective, and non critical. Furthermore, the receiver and transmitter may be configured within a small integrated system.

The online/offline ratio, implemented by system 150 (FIG. 11), is not dominated by turbulence or speckle noise. As known by those skilled in the art, air turbulence causes noise. The density of the gases and the atmosphere at any given location changes as a function of temperature, pressure variation, wind velocity, eddies and shear caused by winds. Turbulence causes changes in the index of refraction of light of the air. Such changes of the index of refraction causes interference effects that change as a function of time. These changes are known as speckle effects, or speckle twinkle.

Speckle may also occur as coherent light (laser light) reflecting off a surface. The speckle pattern is determined by the surface roughness and the transmitter diameter. Surface reflecting zones reflect back the laser light with different optical path links, causing zones of light and dark at the received aperture. A moving sensor on an aircraft, for example, may cause these zones of light and dark to change. These light variations manifest themselves as noise superimposed on the incoming received signal. The inventors have discovered, however, that using the aforementioned online/offline ratio method, as implemented by system 150 for example, mitigates noise due to turbulence effects.

Figure 17:
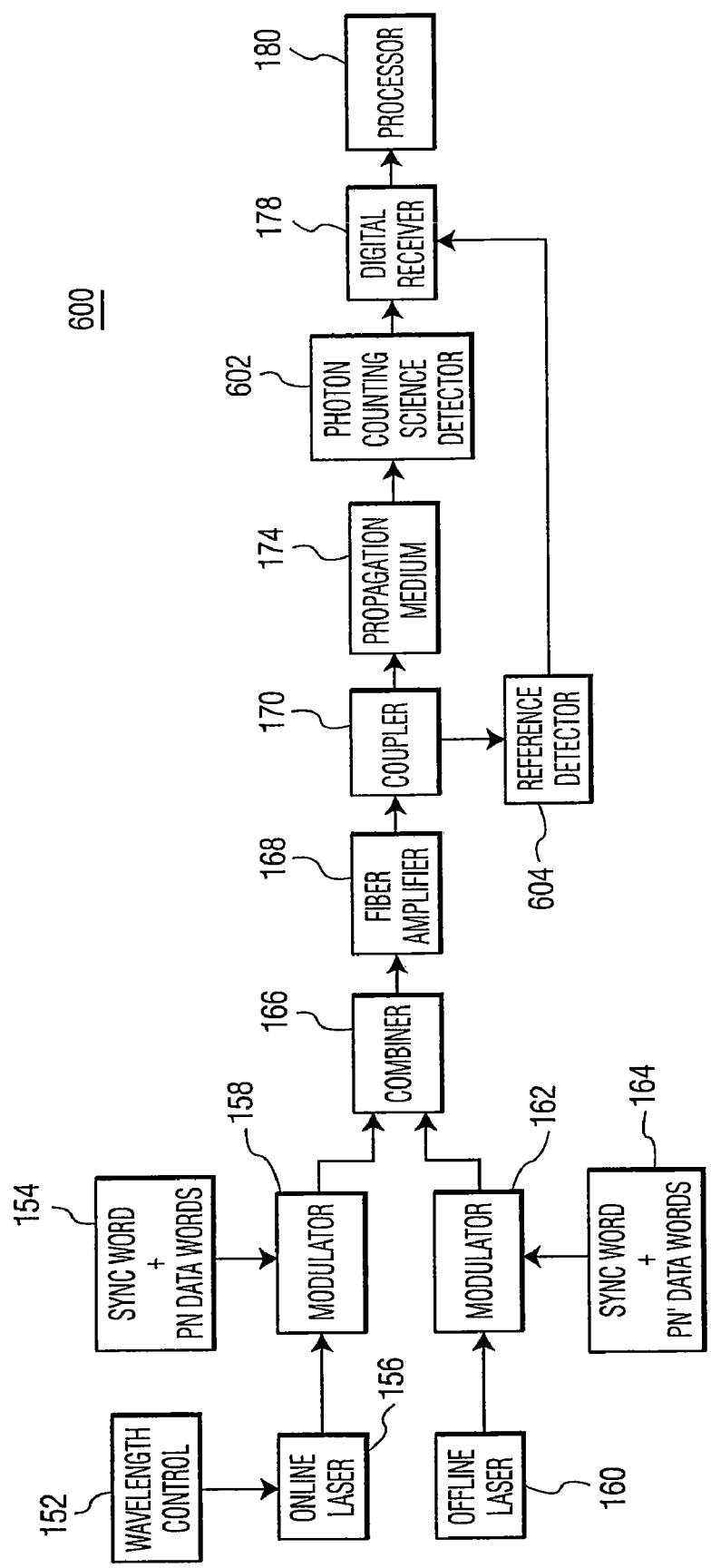
FIG. 17 is a block diagram of yet another embodiment of a digital LIDAR/LADAR system using a digital communications architecture, including a photon counting detector, in accordance with an embodiment of the present invention.

Examples of embodiments providing correlation detection architectures have been described with respect to FIGS. 11 and 12. Another example of a correlation detection architecture will now be described with respect to FIGS. 17 and 18. Referring first to FIG. 17, there is shown system 600 providing measurement of optical properties of a medium. System 600 includes a transmitting portion and a receiving portion. The transmitting portion includes components that may be similar to components of the transmitting portion of system 150 (FIG. 11). Accordingly, the transmitting portion may include wavelength controller 152, online distributed feedback (DFB) laser 156, sync and PN data words module 154, modulator 158, DFB offline laser 160, modulator 162, sync and PN' data words module 164, combiner 166, fiber amplifier 168 and coupler 170.

The receiving portion of system 600 may include a photon counting science detector 602, reference detector 604, digital receiver 178 and processor 180. Processor 180 may be included in both the receiving portion and the transmitting portion of system 600. The output of coupler 170 may be transmitted through propagation medium 174 and received by photon counting science detector 602.

The photon counting science detector 602 replaces science detector 176 of system 150 (FIG. 11). It will be appreciated that science detector 176 may include an analog photo detector, an amplifier/filter, and an analog/digital converter (which provides analog samples to digital receiver 178). Photon counting science detector 602 may replace these three components, namely the analog photo detector, amplifier/filter, and analog/digital converter.

Figure 18:
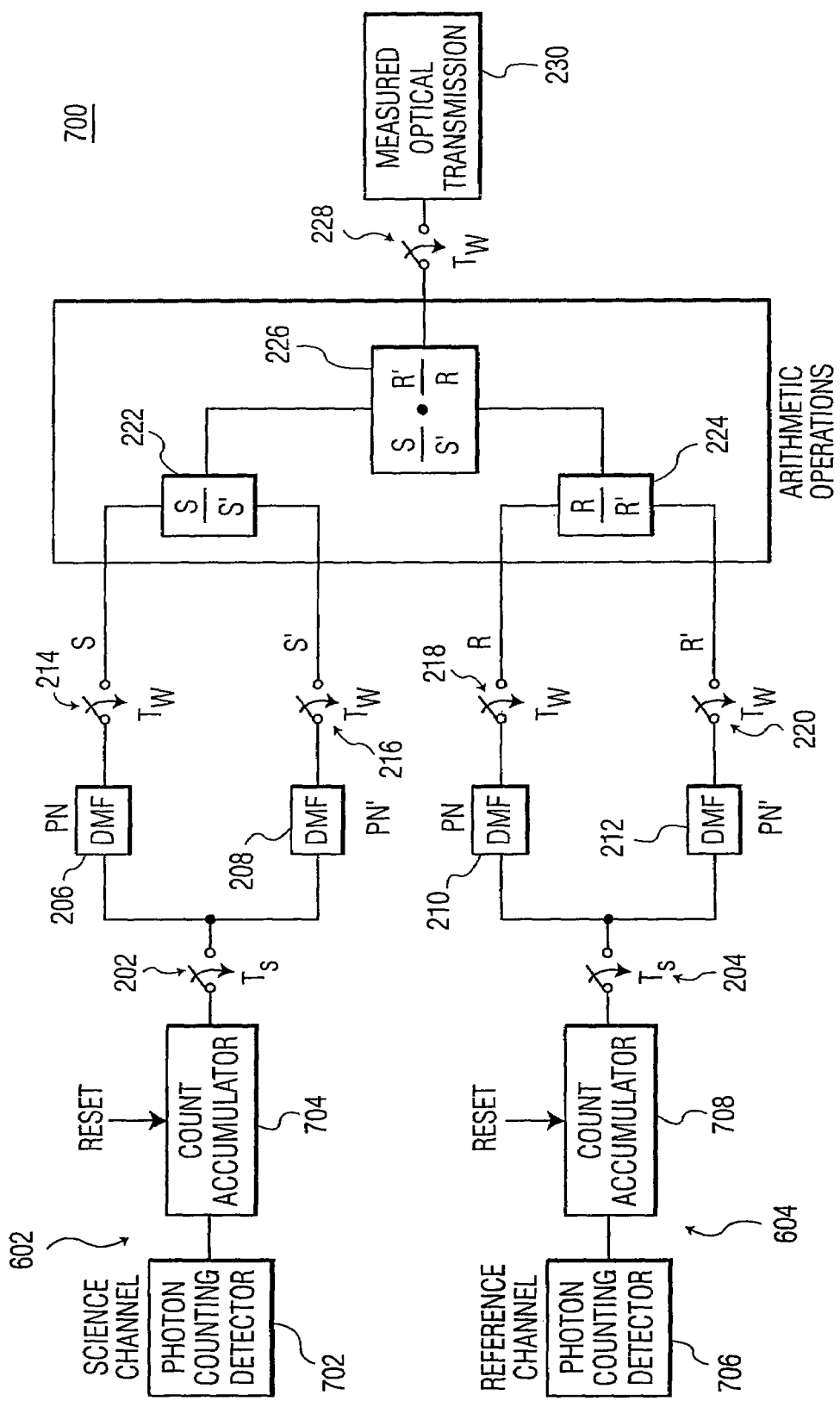
FIG. 18 is a block diagram showing in greater detail two photon detectors and corresponding digital matched filters of the system of FIG. 17, in accordance with an embodiment of the present invention.

The photon counting science detector 602 may include a photon counting detector, a count accumulator, and a reset control for resetting the count accumulator, after the count accumulator is read. These are shown in FIG. 18, for example, as photon counting detector 702 and count accumulator 704. Although not shown, the reset control may be provided by way of processor 180.

The sequence of output values provided from the count accumulator for a predetermined received waveform may be called a count vector. Accordingly, instead of correlating on analog sample values, as described with respect to system 150 (FIG. 11), photon counting science detector 602 may establish a count vector for the PN codeword. The correlation may then be performed using the count vector information.

The composite laser beam collected by receiver optics (not shown), after passage through propagation medium 174, may be routed to photon counting science detector 602. Although the photon counting science detector may receive a very weak return signal, nevertheless the photon counting science detector may advantageously detect the photonic nature of the return signal, by way of photon counting detector 702 and count accumulator 704. As a result, a discrete photoelectron count signal may be routed to digital receiver 178.

It will be understood that reference detector 604 may include an analog detector that is similar to the reference detector of system 150 (FIG. 11). As an alternate embodiment, reference detector 604 may include components that are similar to photon counting science detector 602. As shown in FIG. 18, reference detector 604 includes photon counting detector 706 and count accumulator 708.

Still referring to FIG. 18, system 700 may include components that are similar to components shown in the correlation architecture of system 200 (FIG. 12), with the exception of photon counting science detector 602 and photon counting reference detector 604, both shown on the left portion of FIG. 18.

Digital receiver 178 (FIG. 17) may simultaneously sample both signals from science detector 602 and reference detector 604, at a rate equal to the sampling rate of the transmitted digital message. After synchronization is accomplished (as previously described), digital receiver 178 and processor 180 may process the sequence of data words, one word at a time, to extract a measurement of the relative transmission of the online and offline signal components of the received laser radiation. The correlation of both science and reference detector outputs with DMFs matched to PN and PN' (as shown in FIG. 18) allows a power normalized measurement of the relative transmission of the online and offline signal components of the received laser radiation.

The relative transmission may be given by the ratio of the science detector online correlation peak to the science detector offline correlation peak normalized by the same ratio extracted from the reference detector channel. This process may be continued for a predetermined number of data words, after which (as explained previously) system 600, by way of wavelength controller 152, may modify the wavelength of online laser 156. The relative transmission may again be measured, and then the wavelength of online laser 156 may again be modified. When the end of the laser wavelength scan is reached, the process may be stopped.

As previously described, signal synchronization may be accomplished by correlation detection of a preamble, maximal length, pseudo noise (PN) synchronization word. Resynchronization may be performed at each change of laser radiation wavelength. Accordingly, for each interrogating online laser radiation wavelength, the waveform sent through the system may include a preamble synchronization word followed by a predetermined number of online and offline data words.

The received signal may be sensed in the science channel by photon counting detector 702 and accumulated by count accumulator 704. The counts may be accumulated at a sample duration of $T_s$ and reset after each interval. The reference signal in the reference channel may be detected and accumulated in a manner similar to the detection and accumulation of the science signal, or may be sampled using an analog detector, as previously described.

Assuming that the number of samples per bit waveform is Q, and the number of bits per PN data word (or PN' data word) is P, then Q*P count values may be read into the science channel digital matched filters (DMFs 206 and 208), and Q*P count values or samples (depending on the reference detection method) may be read into the reference channel digital matched filters (DMFs 210 and 212).

The DMFs shown in FIG. 18 may be similar to the DMFs shown in FIG. 13. The output signals of S, S', R, and R' shown in FIG. 18 may be formed similarly as previously described with respect to FIGS. 12 and 13. The ratios formed by modules 222, 224 and 226 may be similar to the ratios described with respect to FIGS. 12 and 13. Although not shown, it will be appreciated that these modules may reside in processor 180. Finally, the measurements performed by module 230, which may also be part of processor 180, may be similar to those described previously with respect to FIG. 12.

Although the invention is illustrated and described herein with reference to specific embodiments, the invention is not intended to be limited to the details shown. Rather, various modifications may be made in the details within the scope and range of equivalents of the claims and without departing from the invention. For example, any digital processing system, known in the field of communications, may be used as an embodiment of the present invention for processing a digitally transmitted/received optical signal to detect and measure a property of a medium. Any communications architecture that preserves the information content of a digitally transmitted signal may be used as an embodiment of the present invention, because digital processing techniques may advantageously provide better signal-to-noise of a received signal, as compared to a received signal processed in an analog communications system.

Extensions and generalizations that use Geiger-mode detection and statistical data processing to extract information may also be used by the invention. These may be used for molecular backscatter measurements and for very low power trace gas detection.

The invention may be used in various weather and climates and may be used to detect, for example, pollution, bio-hazards, and weapons of mass destruction. The invention may also be used in space, on an airborne platform or a ground platform. The platform may be mobile or stationary. The invention may also be used under water and may be a handheld system.

What is claimed:

1. A system for chemical identification of a medium comprising:

a laser for generating a CW carrier, a digital encoder for forming an encoded word, an electro-optic (EO) modulator for modulating the CW carrier with the encoded word to form an encoded CW carrier, a medium for propagating the encoded CW carrier, a receiver configured to detect the propagated, encoded CW carrier to form a detected signal, a processor configured to measure bit error rate (BER) of the detected signal and a wavelength controller, coupled to the laser, for modifying a wavelength of the CW carrier, wherein the medium includes an absorption line, the wavelength controller is configured to modify the wavelength of the CW carrier by scanning about the absorption line, and the processor is configured to identify the medium based on an increase in the BER of the detected signal at the absorption line.

2. The system of claim 1 wherein the encoded CW carrier includes an encoded binary phase shift keyed (BPSK) word, an encoded binary frequency shift keyed (BFSK) word, or a differential phase shift keyed (DPSK) word.

3. The system of claim 1 wherein the medium is disposed within a gaseous atmosphere, a body of water, or a cell of a laboratory.

4. The system of claim 1 wherein the processor includes dual digital matched filters (DMFs) for reconstructing, on a bit-by-bit basis, the detected signal to form a received message word.

5. The system of claim 1 wherein
the processor includes a bit error accumulator for comparing, on a bit-by-bit basis, the encoded word formed by the digital encoder with the detected signal and accumulating bit errors based on the comparison.

6. The system of claim 1 wherein
the digital encoder is configured to form a pseudonoise (PN) encoded word.

7. The system of claim 1 wherein
the digital encoder forms a plurality of identically encoded words,
the modulator modulates the CW carrier with the plurality of identically encoded words,
the receiver forms the detected signal based on the plurality of identically encoded words, and
the processor measures the BER of the detected signal based on the plurality of identically encoded words.

8. A system for measuring properties of a medium comprising:
an electromagnetic generator for forming a CW carrier,
a digital encoder for forming a digital message,
a modulator for modulating the CW carrier with the digital message to form a digitally modulated CW carrier,
a medium for providing a channel for propagating the digitally modulated CW carrier, and
a receiver configured to receive the propagated, digitally modulated CW carrier, wherein the receiver includes a processor configured to measure bit error rate (BER) of the medium.
the receiver is set to detect a signal-to-noise ratio (SNR), in which a relatively small change of SNR provides a relatively large change in bit error probability of the received, digitally modulated CW carrier,
and
the processor is configured to identify the medium based on the measured BER wherein the medium is characterized by a relatively small change of SNR providing a relatively lame change in bit error probability.

9. The system of claim 8 wherein
the medium is disposed within a gaseous atmosphere, a body of water, or a cell of a laboratory.

10. The system of claim 8 wherein
the electromagnetic generator includes a distributed feedback laser.

11. The system of claim 8 wherein
the digital message includes an encoded binary phase shift keyed (BPSK) word, an encoded binary frequency shift keyed (BFSK) word, or a differential phase shift keyed (DPSK) word.

12. The system of claim 8 wherein
the modulator forms the digitally modulated CW carrier using at least one waveform, and
the processor includes a digital matched filter (DMF) for correlating the received propagated, digitally modulated CW carrier with the waveform.

13. A system for chemical identification of a medium comprising:
a laser for generating an optical beam,
a digital modulator for modulating the optical beam to form a digitally modulated optical carrier,
a transmitter for transmitting the digitally modulated optical carrier through the medium,
a receiver for detecting the digitally modulated optical carrier from the medium to form a detected signal, and
a processor including a bit error rate (BER) measuring unit for accumulating bit error of the detected signal, and
identifying the medium based on the accumulated bit error wherein the medium is characterized by a small change in SNR resulting in a relatively large change in BER.

14. The system of claim 13 wherein
the laser generates a CW optical beam,
the processor includes a code generator for forming an encoded word, and
the digital modulator modulates the CW optical beam using the encoded word to form the digitally modulated optical carrier.

15. A method for chemically identifying a medium comprising:
(a) generating a CW carrier;
(b) forming an encoded word;
(c) modulating the CW carrier with the encoded word to form an encoded CW carrier;
(d) propagating the encoded CW carrier through a medium;
(e) receiving the propagated, encoded CW carrier from the medium to form a detected signal; and
(f) measuring bit error rate (BER) of the detected signal, and identifying the medium based on the measured BER, wherein the medium is characterized by a small change in SNR resulting in a relatively large change in BER.

16. The method of claim 15 wherein
step (f) includes accumulating bits of the detected signal,
comparing, on a bit-by-bit basis, the encoded word with the detected signal, and
determining bit errors based on the comparison.

17. The method of claim 15 wherein
step (b) includes forming a pseudonoise (PN) encoded word.

18. A method for chemically identifying a medium comprising:
(a) generating an optical beam;
(b) modulating the optical beam to form a digitally modulated optical carrier;
(c) transmitting the digitally modulated optical carrier through the medium;
(d) receiving the digitally modulated optical carrier from the medium to form a detected signal; and
(e) measuring at least one property of the medium based on the detected signal;
wherein step (e) includes measuring a bit error rate (BER), after accumulating bit errors of the detected signal, and using the accumulated bit errors to identify the medium, and
wherein the medium is characterized by a small change is SNR resulting in a relatively large change in BER.

19. The method of claim 18 wherein
step (a) includes generating a CW optical beam; and
step (b) includes forming an encoded word for a digitally modulating the CW optical beam to form the digitally modulated optical carrier.

* * * * *